United States Patent [19]
Nomiyama et al.

[11] Patent Number: 5,218,587
[45] Date of Patent: Jun. 8, 1993

[54] MAGNETIC OPTICAL RECORDING/REPRODUCING APPARATUS

[75] Inventors: Takashi Nomiyama; Akemi Murakami; Shoji Yamaguchi; Kaoru Yasukawa; Daisuke Iguchi, all of Kanagawa, Japan

[73] Assignee: Fuji Xerox Co., Ltd., Tokyo, Japan

[21] Appl. No.: 545,521

[22] Filed: Jun. 29, 1990

[30] Foreign Application Priority Data

Jun. 30, 1989 [JP] Japan .................................. 1-166800
Jul. 25, 1989 [JP] Japan .................................. 1-190576
Feb. 27, 1990 [JP] Japan .................................. 2-44634

[51] Int. Cl.⁵ .......................... G11B 21/00; G11B 7/08
[52] U.S. Cl. ............................. 369/44.16; 369/44.15; 369/44.22
[58] Field of Search ................. 369/44.15, 44.16, 44.22

[56] References Cited

U.S. PATENT DOCUMENTS

| | | | |
|---|---|---|---|
| 4,386,823 | 6/1983 | Musha | 369/44.16 |
| 4,408,313 | 10/1983 | Musha | 369/44.16 |
| 4,419,614 | 12/1983 | Kimura | 369/44.16 |
| 4,479,051 | 10/1984 | Musha | 369/44.16 |
| 4,482,986 | 11/1984 | Noda et al. | 369/44.16 |
| 4,507,764 | 3/1985 | Musha | 369/44.16 |
| 4,554,653 | 11/1985 | Malissin et al. | 369/44.16 |
| 4,583,212 | 4/1986 | Koide et al. | 369/219 |
| 4,641,296 | 2/1987 | Mizunoe et al. | 369/44.16 |
| 4,660,190 | 4/1987 | Fujii et al. | 369/44.16 |
| 4,782,476 | 11/1988 | Sekimoto et al. | 369/44.15 |
| 4,822,139 | 4/1989 | Yoshizumi | 369/44.16 |

FOREIGN PATENT DOCUMENTS

| | | |
|---|---|---|
| 0118626A1 | 9/1984 | European Pat. Off. . |
| 2455331 | 11/1980 | France . |
| 63-50927 | 3/1988 | Japan . |
| 1-90838 | 4/1989 | Japan . |
| 2-270138 | 2/1990 | Japan . |

OTHER PUBLICATIONS

Patent Abstract of Japan, vol. 12, No. 266 (P-735) (3113), Jul. 26, 1988.
Patent Abstract of Japan, vol. 7, No. 48 (P-178) (1193), Feb. 24, 1983.
Topical Meeting on Optical Data Storage, Washington, D.C., Oct. 15-17, 1985, pp. ThAA5-1-ThAA5-4, IEEE, New York, K. Yoshizumi et al.
European Search Report.

*Primary Examiner*—Roy N. Envall, Jr.
*Assistant Examiner*—Jennifer L. Hazard
*Attorney, Agent, or Firm*—Finnegan, Henderson, Farabow, Garrett & Dunner

[57] ABSTRACT

A magnetic optical recording/reproducing apparatus comprising: a movable focus adjusting member including converging means for converging a light beams emitted from a light source on a focal plane of an optical recording medium, focus coil means for driving the converging means in a direction substantially vertical to the plane of the optical recording medium by electromagnetic force when a current is applied, seek coil means for driving the converging means in a radial direction of the optical recording medium by electromagnetic force when a current is applied, and support means for supporting the focus coil means and the seek coil means; a carriage means for moving the movable focus adjusting member in the radial direction of the optical recording medium; and spring means fixed at one portion thereof to the movable focus adjusting member and the other end portion thereof to the carriage means for supporting the movable focus adjusting member to move the movable focus adjusting member to the carriage means in a direction substantially vertical to the plane of the optical recording medium.

16 Claims, 23 Drawing Sheets

MAGNETIC OPTICAL RECORDING/REPRODUCING APPARATUS

BACKGROUND OF THE INVENTION

The present invention relates to an optical recording/reproducing apparatus for recording and reproducing or recording, reproducing and erasing data by using optical recording medium, such as an optical disk and optical/magnetic disk. More particularly, the present invention relates to an optical recording/reproducing apparatus in which seek and tracking controls are exact and reliable.

A schematic illustration of this type of an optical recording/reproducing apparatus, that is known, is shown in FIG. 1. As shown, the recording/reproducing apparatus is composed of a semiconductor laser (a) as a light source, a collimeter (b) for converting diffusion laser beams emitted from the laser (a) into parallel laser beams, a beam shape prism (c) for reforming a spot shape of a laser beam from an elliptical shape into a substantially circular shape, a beam splitter (e) for splitting an incident laser beam incident on an optical recording medium (d) and a reflecting laser beam reflected from the recording medium (d) one from the other, a ¼ wavelength plate (f) for converting a laser beam of linear polarization as transmitted through the beam splitter (e) into a laser beam of circular polarization, an objective (g) for focusing laser beams transmitted through the ¼ wavelength plate (f) on a focal plane of the recording medium (d), and a cylindrical lens (j) for guiding a reflected laser beam emitted form the beam splitter (e) to a quartered PIN photo diode (h) which is for obtaining a tracking error signal, a focus error signal, and a reproducing RF signal.

In the optical recording/reproducing apparatus, to cope with eccentricity of the recording medium (d), and undulation and warp of the same, and the like, the tracking and focus controls are performed by using a tracking error signal and a focus error signal as derived from the quartered PIN photo diode. To read data from the recording medium, a seek control is required to move an optical head from a track to another. To this end, a drive system as described in Japanese Patent Unexamined Publication No. Sho. 63-50927 is assembled into the recording/reproducing apparatus.

The drive system, as shown in FIGS. 2 and 3, is composed of a bobbin (m), a focus adjust movable portion (p), a carriage member (s), and a plate spring (t). A yoke (k) is inserted into the tube of the bobbin (m). A focus coil (fc) and seek coil (sc) are wound around the bobbin (m). The movable focus adjusting member (p) includes an objective (g) mounted on the bobbin (m) by a support member (n). The carriage member (s) carrying the movable focus adjusting member (p) is movable along a rail (q), which is disposed in the radial direction of the recording medium (d), with the aid of a bearing (r). The plate spring (t) is fastened at one end to the movable focus adjusting member (p) and at the other end to the carriage member (s). The plate spring supports the movable focus adjusting member (p), while allowing the portion (p) to move in the direction substantially vertical to the surface of the recording medium (d). When current is fed to the seek coil (sc), an electromagnetic force, or a seek drive force, acts on the seek coil (sc). The seek drive force is transferred through the plate spring (t) to the carriage member (s). By the drive force, the carriage member (s) is moved in the radial direction of the recording medium (d), thereby to effect the seek control and the tracking control. When current is fed to the focus coil (fc), an electromagnetic force, or a focus drive force, acts on the focus coil (fc). By the focus drive force, the movable focus adjusting member (p) is moved in the radial direction of the recording medium (d), thereby to effect the focus control.

Reference character (u) designates a permanent magnet for developing magnetic lines of force directed to the seek coil (sc) and the focus coil (fc). FIG. 4 shows an equivalent mechanism of the drive system in the optical recording/reproducing apparatus as shown in FIGS. 2 and 3. In the figure, (f$_s$) indicates a seek drive force acting on the movable focus adjusting member (p). (f$_f$) indicates a focus drive force acting on the movable focus adjusting member (p).

As described above, in the drive system of the conventional optical recording/reproducing apparatus, the electromagnetic force acting on the focus adjust movable porion (p) is transferred through the plate spring (t) to the carriage member (s). By the drive force, the movable focus adjusting member (p), together with the carriage member (s), is moved in the radial direction of the recording medium d), thereby to effect both the seek control and the tracking control. Where a frequency of the current fed to the seek coil is increased to be higher than a present frequency, that is, the movable focus adjusting member (g) and the carriage member (s) are slightly vibrated for the tracking control purposes, the electromagnetic force, which acts on the seek coil (sc) through the plate spring (t), sometimes is not transmitted to the carriage porion (s).

When the electromagnetic force is not transmitted, the simultaneous movement of the movable focus adjusting member (p) and the carriage member (s) is lost and a relative displacement occurs therebetween, to cause a resonance. Under this condition, an unexact tracking control may occur.

FIGS. 5 and 6 are graphs for explaining occurrence of resonance at specific frequencies (several hundreds Hz to several kHz). When the movable focus adjusting member (p) and the carriage member (s) are vibrating, an amplitude of a vibration of the movable focus adjusting member (p) in the focus direction varies against a frequency, as shown in FIG. 5. When the focus adjust movable porion (p) and the carriage member (s) are vibrating, a phase of a vibration of the movable focus adjusting member (p) varies against a frequency, as shown in FIG. 6.

SUMMARY OF THE INVENTION

It is therefore an object of this invention to provide an optical recording/reproducing apparatus which can exactly control a tracking operation irrespective of a frequency value of the current fed to the seek coil.

To achieve the above object, there is provided an optical recording/reproducing apparatus comprising:

a movable focus adjusting member including an objective disposed near an optical recording medium and for focusing a convergent bundle of light beams emitted from a light source on a focal plane of the optical recording medium, a focus coil for driving the objective in the direction substantially vertical to the plane of the optical recording medium by an electromagnetic force as generated by current feed, a seek coil for driving the objective in the radial direction of the optical recording medium by an electromagnetic force as generated by current feed, a coil support for supporting the focus coil and the first seek coil, and the objective, focus coil, seek coil, and the coil support being assembled into a unit;

a carriage member carrying the movable focus adjusting member thereon and being movable in the radial direction of the optical recording medium; and a plate spring fixed at one end to the movable focus adjusting member and at the other end to the carriage member, the plate spring supporting the movable focus adjusting member in a state that the movable focus adjusting member is movable in the direction substantially vertical to a plane of the optical recording medium;

the improvement in which the optical recording/reproducing apparatus further includes an internal force generating means for generating an action force and a reaction force whose directions are opposite to each other in the radial direction of an optical recording medium in the carriage member and the movable focus adjusting member, and magnetic fluid filling a gap between the carriage member and the movable focus adjusting member.

In the above technical means, the internal force generating means provided between the carriage member and the movable focus adjusting member may have a structure that an action force as one of an internal force acts on the carriage member, while a reaction force as the other acts on the movable focus adjusting member or a structure that the action force acts on the movable focus adjusting member, while the reaction force acts on the carriage member.

Where the coil support is constructed with a lens holder that holds the objective and is wound by the focus coil, and the bobbin that is mounted on the outer surface of the lens holder and wound by the seek coil, the internal force generating means may be constructed with the focus adjust magnet that is disposed within the tube of the bobbin, and mounted at both ends to the carriage member, and generates magnetic lines of force directed toward the focus coil, and the seek coil wound around the bobbin. In this structure, the action force acts on the movable focus adjusting member with the seek coil, while the reaction force acts on the carriage member.

Further, an object of the present invention is to provide an optical recording/reproducing apparatus which can exactly control seek and tracking operations.

According to the present invention, there is provided an optical recording/reproducing apparatus comprising:

a movable focus adjusting member including an objective disposed near an optical recording medium and for focusing a convergent bundle of light beams emitted from a light source on a focal plane of the optical recording medium, a focus coil for driving the objective in the direction substantially vertical to the plane of the optical recording medium by an electromagnetic force as generated by current feed, a first seek coil for driving the objective in the radial direction of the optical recording medium by an electromagnetic force as generated by current feed, a coil support for supporting the focus coil and the first seek coil, and the objective, focus coil, first seek coil, and the coil support being assembled into a unit;

a carriage member including a carriage body carrying the movable focus adjusting member thereon and being movable in the radial direction of the optical recording medium, and a second seek coil for driving the carriage body in the radial direction of the optical recording medium by electromagnetic force as generated by current feed, the second seek coil being provided on the carriage body; and a plate spring fixed at one end to the movable focus adjusting member and at the other end to the carriage member, the plate spring supporting the movable focus adjusting member in a state that the movable focus adjusting member is movable in the direction substantially vertical to a plane of the optical recording medium;

the improvement in which a first drive circuit for feeding current to the first seek coil is coupled with the first seek coil, and a second drive circuit for feeding current to the second seek coil is coupled with the second seek coil; and a ratio of a first drive force and a second drive force, which respectively act on the movable focus adjusting member and the carriage member when current is fed to the first and second seek coils, is equal to a weight ratio of the movable focus adjusting member and the carriage member.

According to the present invention, there is provided an optical recording/reproducing apparatus comprising the movable focus adjusting member, the carriage member, and the plate spring, which have substantially the same arrangement as described above, the improvement in which the first and second seek coils are connected in series, and to a single drive circuit for feeding current to the first and second seek coils, and a ratio of a first drive force and a second drive force, which respectively act on the movable focus adjusting member and the carriage member when current is fed to the first and second seek coils, is equal to a weight ratio of the movable focus adjusting member and the carriage member.

Therefore, the first drive circuit for feeding current to the first seek coil and the second drive circuit for feeding current to the second seek coil are provided so as not to be formed to a closed circuit between first and second seek coils so that phase shift is not occurred when the current flows through the first and second seek coils.

On the other hand, the first and second seek coils are connected in series and connected to the single drive circuit so that the amount of currents flowing in the first and the second seek coils are equal to each other to avoid the phase shift.

Furthermore, there is provided an optical recording/reproducing apparatus further comprising:

a movable focus adjusting member including an objective disposed near an optical recording medium and for focusing a convergent bundle of light beams emitted from a light source on a focal plane of the optical recording medium, a focus coil for driving the objective in the direction substantially vertical to the plane of the optical recording medium by an electromagnetic force as generated by current feed, a first seek coil for driving the objective in the radial direction of the optical recording medium by an electromagnetic force as generated by current feed, a first coil support for supporting the focus coil and the first seek coil, and the objective, focus coil, the first seek coil, and the first coil support being assembled into a unit;

a carriage member including a carriage body carrying the movable focus adjusting member thereon and being movable in the radial direction of the optical recording medium, and a second seek coil for driving the carriage body in the radial direction of the optical recording medium by an electromagnetic force as generated by current feed, the second seek coil being provided on a second coil support of the carriage body;

a plate spring fixed at one end to the movable focus adjusting member and at the other end to the carriage member, the plate spring supporting the movable focus adjusting member in a state that the movable focus adjusting member is movable in the direction substantially vertical to a plane of the optical recording medium;

a couple of endless magnetic yokes each including a center magnetic yoke including a center magnetic yoke inserted into insertion holes that are respectively formed in the first coil support of the movable focus adjusting member and the second coil support of the carriage, the center magnetic yoke disposed extending in the radial direction of the optical recording medium, a back magnetic yoke disposed extending in the longitudinal direction of the center magnetic yoke; and a pair of side magnetic yokes provided at both ends of the center magnetic yoke and the back magnetic yoke, thereby coupling the center magnetic yoke and the back magnetic yoke; and a couple of magnets each disposed extending in the longitudinal direction of the center magnetic yoke and generating magnetic liens of force toward the center magnetic yoke; and the optical recording/reproducing apparatus being improved in that a couple of means being respectively mounted on the center magnetic yokes in the endless magnetic yokes, each the means reducing a magnetic field from the center magnetic yoke when current is fed to the first seek coil and the second seek coil.

In the optical recording/reproducing apparatus according to the represent invention, each of the magnetic field reducing means is conductive means, the conductive means being disposed extending in the longitudinal direction of each the center magnetic yoke and covering the center magnetic yoke.

In the optical recording/reproducing apparatus according to the present invention, each of the magnetic field reducing means includes:

a wire conductor uniformly wound around an electrical insulating means covering the center magnetic yoke; and a magnetic field adjust drive circuit for feeding to the wire conductor a current whose direction is opposite to that of the current fed to the first and second seek coils, In the optical recording/reproducing apparatus according to the present invention, each of the magnetic field reducing means includes:

a plurality of wire conductors separately disposed along each the center magnetic yoke, and each the wire conductor being uniformly wound around an electrical insulating means covering the center magnetic yoke; and a plurality of magnetic field adjust drive circuits respectively provided in association with the wire conductors, each the magnetic field adjust drive circuit for feeding to the wire conductor a current whose direction is opposite to that of the current fed to the first and second seek coils.

With the above arrangement, a wire conductor develops a magnetic field in which a direction of the magnetic filed is opposite to the direction of the magnetic field developed by the center magnetic yoke. As a result, a distribution of the magnetic field developed by the magnet is reduced so that the magnetic field developed by the magnet could be constantly maintained regardless of whether the current flows to the first and second seek coils.

DETAILED DESCRIPTION OF THE PREFERRED EMBODIMENTS OF THE INVENTION

Figure 1:
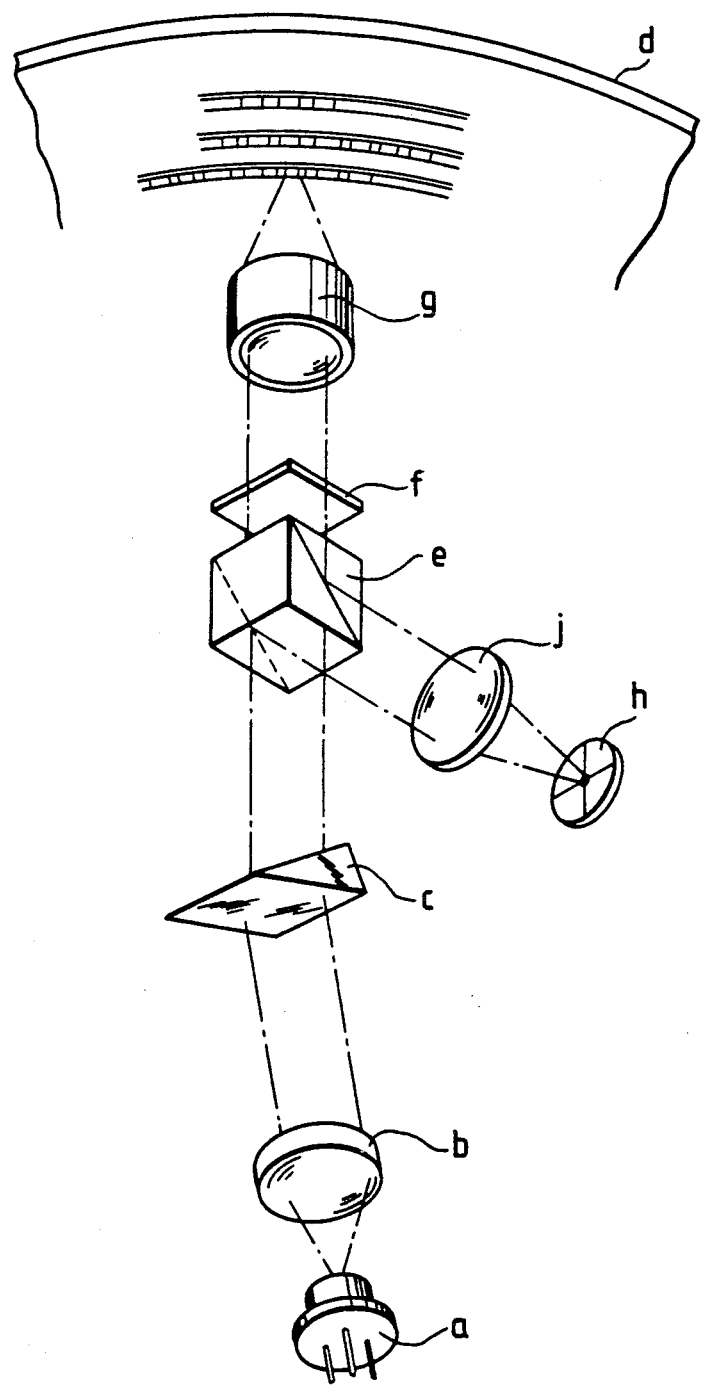
FIG. 1 shows a schematic illustration of the optical recording/reproducing apparatus.
Figure 2:
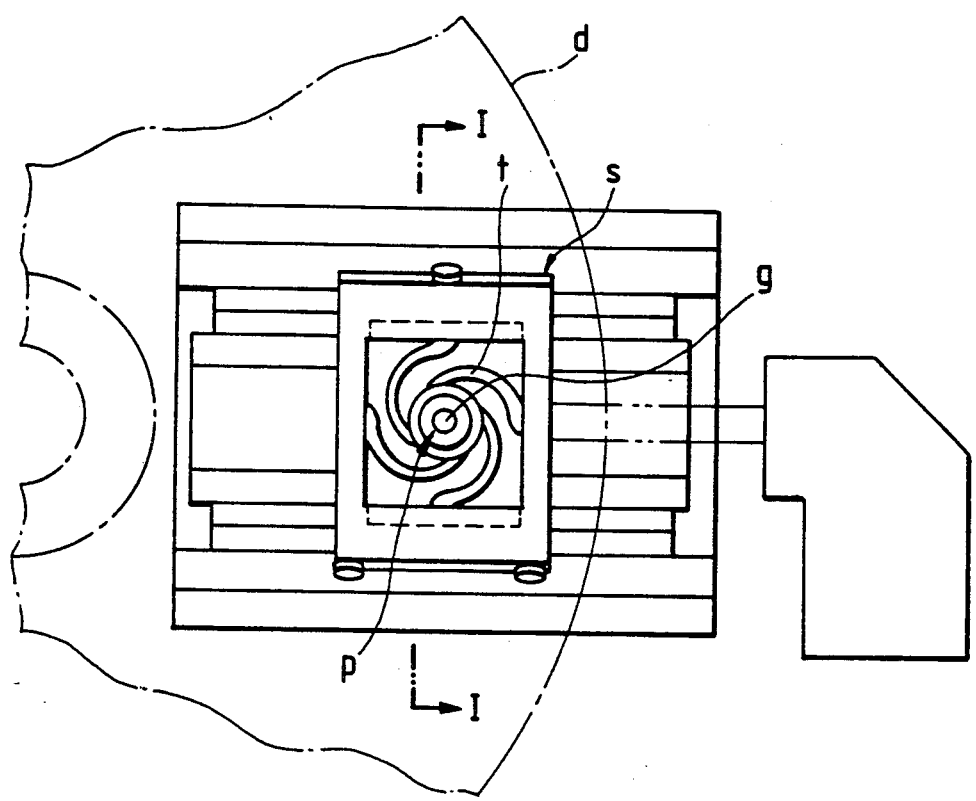
FIG. 2 is a plan view of an optical recording/reproducing apparatus into which a drive system is incorporated.
Figure 3:
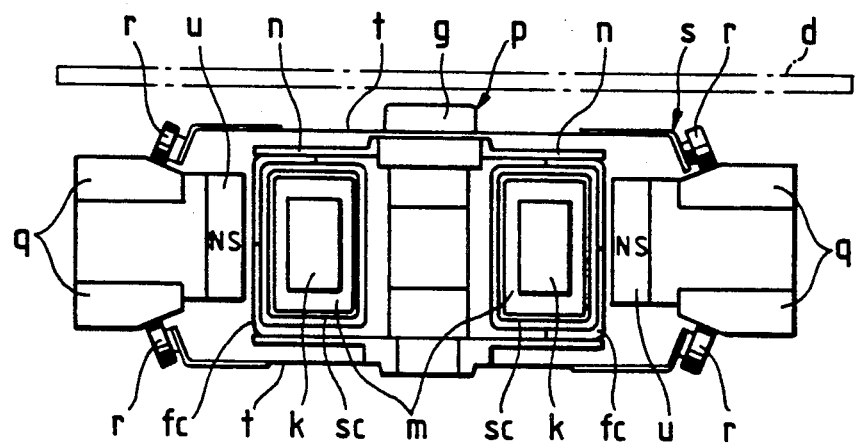
FIG. 3 shows a cross sectional view taken on line I—I in FIG. 2.
Figure 4:
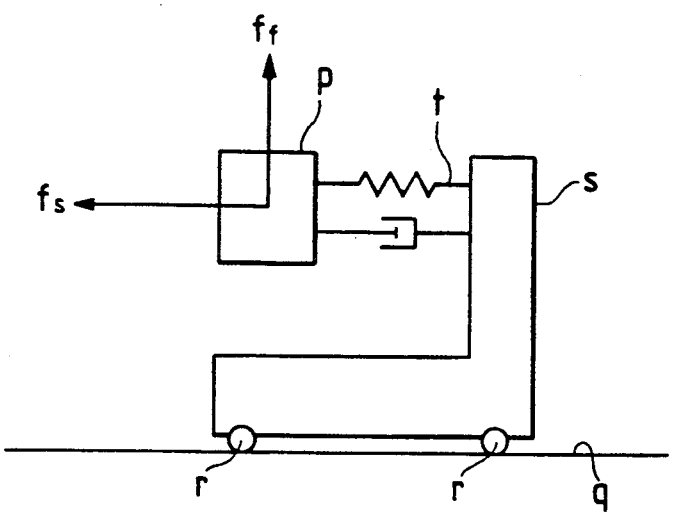
FIG. 4 is an mechanical equivalent diagram of the instant apparatus.

Japanese Patent Application No. Hei 1-90838 (the same inventorship and assignee as those of the present invention.) which is herein incorporated by reference and which is relevant to the present invention has proposed an internal force generating an action force and a reaction force whose directions are opposite to each other in the radial direction of an optical recording medium in said carriage member and said movable focus adjusting member, and the action or reaction force is used for driving the carriage member(s), thereby to eliminate the resonance problem.

An embodiment of the present invention to be described hereinbelow provides certain advantages over the foregoing structure, giving attention to the following structure to the following and to characteristics of the structure described above.

An object of the embodiment of the invention is to provide an optical recording/reproducing apparatus which can exactly control a tracking operation irrespective of a frequency value of the current fed to the seek coil.

First embodiment

To achieve the above object, there is provided an optical recording/reproducing apparatus comprising:

A movable focus adjusting member including an objective disposed near an optical recording medium and for focusing a convergent bundle of light beams emitted from a light source on a focal plane of the optical recording medium, a focus coil for driving the objective in the direction substantially vertical to the plane of the optical recording medium by an electromagnetic force as generated by current feed, a seek coil for driving the objective in the radial direction of the optical recording medium by an electromagnetic force as generated by current feed, a coil support for supporting the focus coil and the first seek coil, and the objective, focus coil, seek coil, and the coil support being assembled into a unit;

a carriage member carrying the movable focus adjusting member thereon and being movable in the radial direction of the optical recording medium; and a plate spring fixed at one end to the movable focus adjusting member and at the other end to the carriage member, the plate spring supporting the movable focus adjusting member in a state that the movable focus adjusting member is movable in the direction substantially vertical to a plane of the optical recording medium; and the improvement in which the optical recording/reproducing apparatus further includes an internal force generating means for generating an action force and a reaction force whose directions are opposite to each other in the radial direction of an optical recording medium in the carriage member and the movable focus adjusting member, and magnetic fluid filling a gap between the carriage member and the movable focus adjusting member.

In the above technical means, the internal force generating means provided between the carriage member and the movable focus adjusting member may have a structure that an action force as one of an internal force acts on the carriage member, while a reaction force as the other acts on the movable focus adjusting member or a structure that the action force acts on the movable focus adjusting member, while the reaction force acts on the carriage member.

Where the coil support is constructed with a lens holder that holds the objective and is wound by the focus coil, and the bobbin that is mounted on the outer surface of the lens holder and wound by the seek coil, the internal force generating means may be constructed with the focus adjust magnet that is disposed within the tube of the bobbin, and mounted at both ends to the carriage member, and generates magnetic lines of force directed toward the focus coil, and the seek coil wound around the bobbin. In this structure, the action force acts on the movable focus adjusting member with the seek coil, while the reaction force acts on the carriage member.

To prevent the resonance, the action or reaction force must have such a value as to satisfy the requirements as described hereinafter.

Figure 11:
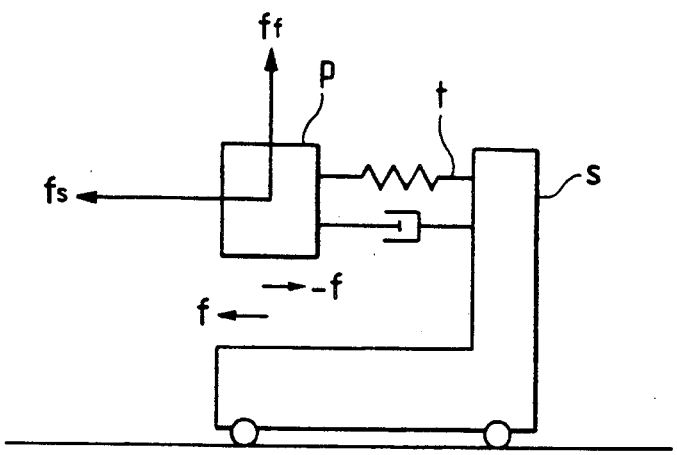
FIG. 11 shows a mechanical equivalent diagram.

To obtain the requirements, reference is made to a mechanical equivalent diagram shown in FIG. 11. The equations of motion of the movable focus adjusting member (p) and the carriage member (s) are given by:

$$m \, (d^2x/dt^2) + K \, (x-y) = f_s - f$$

$$M \, (d_2y/dt^2) + K \, (y-x) = f$$

where
m: mass of the movable focus adjusting member (p)
M: mass of the cartridge member (s)
K: spring constant of the plate spring (t) in the seek direction
$f_s$: seek drive force
f: internal force
x: displacement of the movable focus adjusting member (p) in the seek direction
y: displacement of the carriage member (s) in the seek direction Laplace transforming those equations, then we have a transfer function of a displacement of the movable focus adjusting member (p) in response to a seek drive force as given below:

$$X(S)/F_s(S) = [\{mMs^2 = (m + M)K\} + M^2S^2$$

$$[M(m + M)S^2 \times F/F_2] \times 1/\{mMS^2 +$$

$$(m + M)K\} \times 1/(m + M)S^2$$

where F (m+M)=$F_s$·M, and X, $F_s$ and F are Laplace transforms of x, $f_s$ and f, respectively.

If f=$f_s$·M/(m+M), the transfer function is rearranged into:

$$X \, (S)/F_s \, (S) = 1/(m+M)S^2$$

The above equation is free from the spring constant K. Accordingly so far as it holds, no resonance occurs.

The relation, f=$f_s$·M/(m+M) can be satisfied by properly selecting the number of turns of the seek coil wound around the bobbin, and the magnetic force of each of the focus adjust magnet and the seek adjust magnet.

In order words, the resonance can be reliably prevented by properly selecting those parameters. The magnetic liquid fills the gap between the carriage member and the movable focus adjusting member, thereby to enhance the resonance prevention.

In assembling the movable focus adjusting member and the carriage member into an optical recording/reproducing apparatus, limits of configuring the focus adjust movable part and the carriage member, and limit of working accuracy sometimes cause a non-uniform gap between the movable focus adjusting member and the carriage member. Even if the internal force generating means is provided between the carriage member and the movable focus adjusting member, a resonance sometimes occurs due to the non-uniform gap. The magnetic fluid absorbs the resonance of the carriage member and the focus adjust portion to couple them into a unit and hence to reliably remove the resonance.

This magnetic fluid as colloid liquid may be composed of solvent, such as ester hydrocarbon, oil, carbon fluoride oil, and water, magnetic material, such as ferromagnetic oxide and ferromagnetic metal, that is dispersed into the solvent by using surface active agent. "MARPOMAGNA" (trade name, manufactured by Matsumoto Yushi Seiyaku Company, Japan) may be used for the magnetic liquid. The permanent magnet mounted on the carriage member or the movable focus adjusting member is available for means for holding the magnet liquid.

Figure 7:
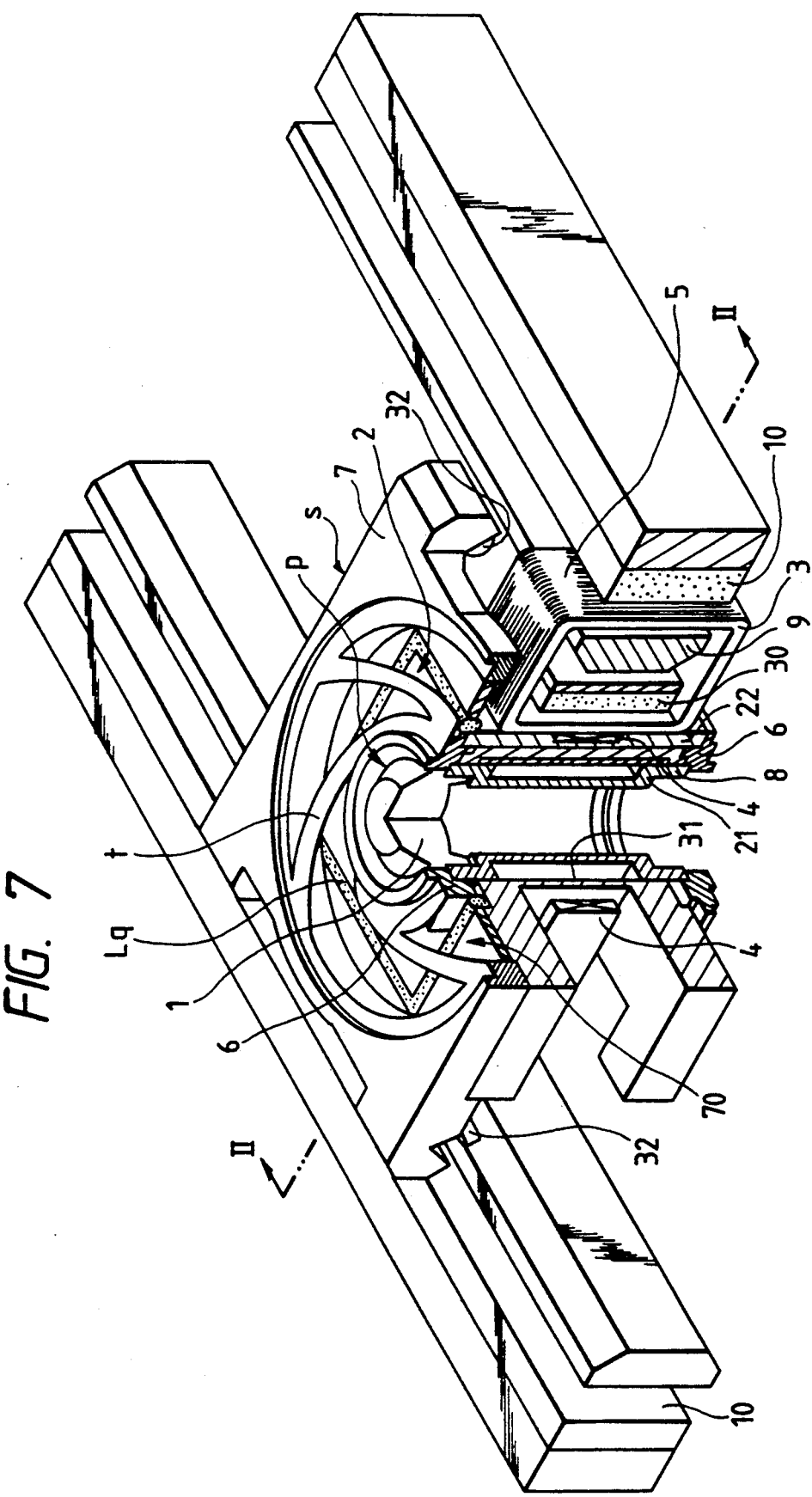
FIG. 7 is a partially broken perspective view of the optical recording/reproducing apparatus according to the first embodiment.
Figure 8:
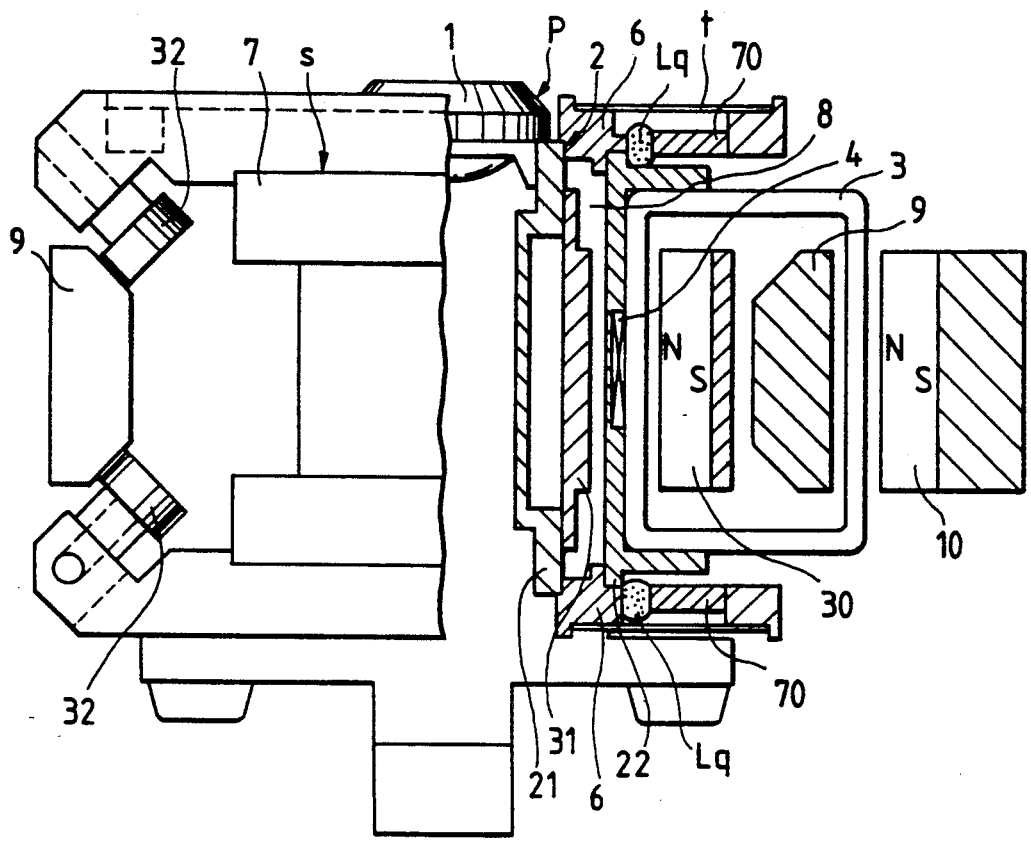
FIG. 8 shows a cross sectional view taken on line II—II in FIG. 7.

As shown in FIGS. 7 and 8, an optical recording/reproducing apparatus according to a first embodiment of the present invention is composed of a movable focus adjusting member (p), a carriage member (s) carrying the movable portion (p), a plate spring (t) coupling the carriage member (s) with the movable portion (p), and magnetic fluid (Lq) filling a gap between the carriage member (s) and the movable focus adjusting member (p).

The movable focus adjusting member (p) is made up of an objective lens 1, a tubular lens holder 2 which is substantially rectangular in cross section and holds the objective lens 1, a pair of bobbins fitted around the outer surface of the lens holder 2, a focus coil 4 wound around the lens holder 2, and a seek coil 5 wound around the bobbin 3. Those components are assembled into a unit.

The lens holder 2 holds the objective 1 in the upper portion, and the central portion of the lens holder includes a tubular inner housing 21 whose inner diameter is smaller than that of the remaining portion, and a tubular outer housing 22 which is disposed around the inner housing by means of coupling plates 6 and 6. A focus coil 4 is wound around the outer surface of the outer housing 22. A gap 8 is formed between the inner and outer housing 21 and 22. A part of the carriage body 7 of the carriage member (s) is set in the gap. Within each tubular bobbin 3, a rail 9 is disposed in the radial direction of an optical recording medium (not shown). A permanent magnet 120 is disposed along each rail 9, while the N pole of the permanent magnet is directed toward the bobbin 3. The permanent magnets 10 and 10 for seek adjust purposes are for forming magnetic forces directed toward the seek coils 5 and 5 wound around the bobbins 3.

The carriage member (s) includes a carriage body 7 whose top and bottom faces opened in the center portion, and a pair of focus adjust permanent magnets 30 mounted on the carriage body 7. A center portion of the carriage body 7 constitutes a tubular portion 31. This tubular portion 31 is inserted into the gap 8 between the inner and outer housings 21 and 22 of the lens holder 2. The inner wall of the tubular portion 31 slidably contacts the outer wall of the inner housing 21. Within the tubular portion of the bobbin 3, each permanent magnet 30 is disposed whose N pole is faces the focus coil 4. The top and bottom ends of the permanent magnet 30 are mounted on the carriage body 7. Bearings 32 and 32 are mounted at the four corners of the carriage body 7. These bearings engage the rails 9 and 9 to allow the carriage member (s) to move in the radial direction of the optical recording medium.

The plate spring (t) is constructed with a spiral metal member. The inner side of the plate spring (t) is mounted to the lens holder 2 in the movable focus adjusting member (p), while the outer sides of the plate springs are fastened to the top and bottom portions of the carriage body 7 in the carriage member (s). Use of the plate spring (t) allows the movable focus adjusting member (p) to vertically move.

Figure 9:
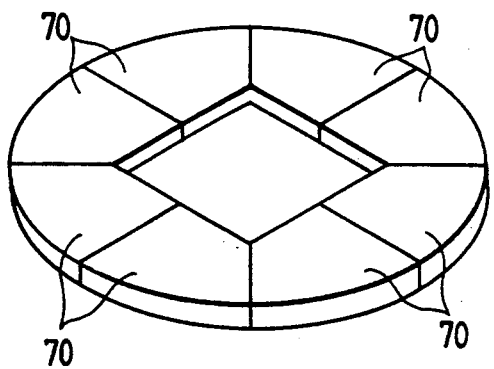
FIG. 9 shows a perspective view of a permanent magnet group.
Figure 10:
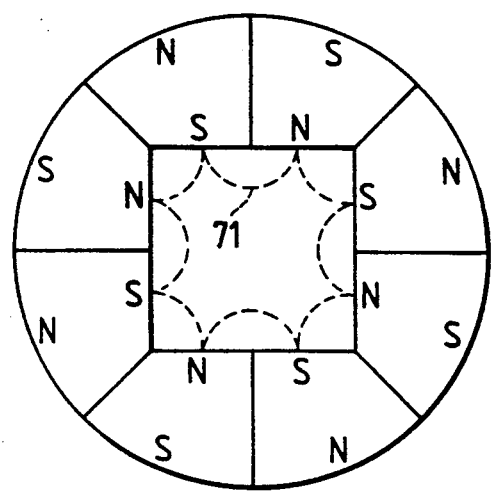
FIG. 10 shows a plan view of the permanent magnet group.

A group of permanent magnets 70 to 70, which are arranged in a ring fashion as shown in FIGS. 9 and 10, is fitted in each of the top and bottom opening portions of the carriage body 7. The magnet fluid (Lq) is attracted and held by the permanent magnet group 70 and 70. Namely, those permanent magnets are disposed alternately in terms of polarity. The magnet liquid (Lq) is held along the magnetic lines of force as formed among the permanent magnets 70 and 70 as shown in FIG. 10, while filling the gap between the lens holder 2 and the carriage body 7. "MARPOMAGNA" may be used for the magnetic fluid (Lq).

In the optical recording/reproducing apparatus thus arranged, a convergent bundle of light beams emitted from a light source (not shown) located outside a main body of the apparatus is incident on the objective 1 through a reflecting prism (not shown). The light beams converges on a focal plane of an optical recording medium (not shown) by the objective lens 1, thereby to effect the recording, reproducing and erasing of data in connection with the recording medium.

Figure 5:
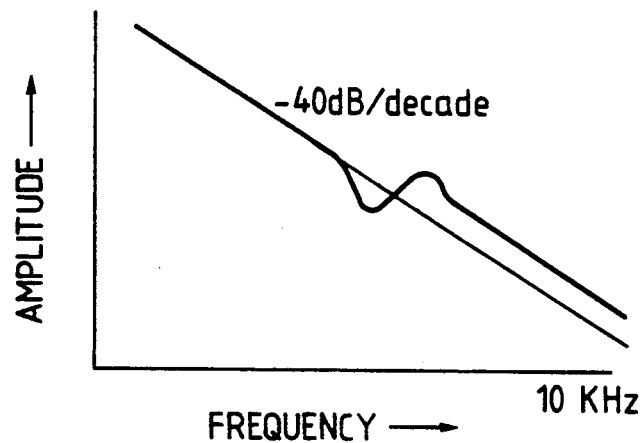
FIG. 5 is a graph showing a relationship between amplitude and frequency of a vibration of the movable focus adjusting member in the seek direction.
Figure 6:
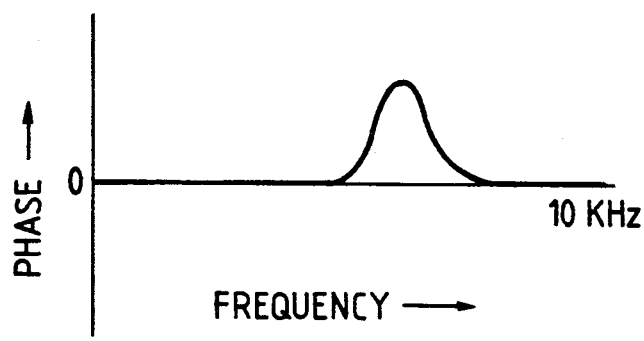
FIG. 6 is a graph showing a relationship between phase and frequency of a vibration of the movable focus adjusting member in the seek direction.

In the apparatus, when current is fed to the seek coil 5 through a lead line (not shown), magnetic lines of force emanating from the seek adjust permanent magnet 10 acts on the seek coil 6 outside the bobbin 3. As shown in FIG. 11 showing a mechanical equivalent diagram, a seek drive force ($f_s$) acts on the movable focus adjusting member (p), to effect the seek control and the tracking control. When current is fed to the focus coil 4, the magnetic lines of force emanating from the focus adjust permanent magnet 30 acts on the focus coil 4. As shown in FIG. 5 showing a mechanical equivalent diagram, a focus drive force ($f_f$) acts on the movable focus adjusting member (p), to effect the focus control.

In the seek control mode and the tracking control mode, the magnetic lines of force emanating from the focus adjust permanent magnet 30 also act on a inner side of the bobbin 3, namely the magnetic lines acts on seek coil 5 closer to the lens holder 2. Further, the direction on the current flowing through the seek coil 5 closer to the lens holder 2 located there is opposite to that of the current flowing through the seek coil 6 outside the bobbin. This seek coil 5 generates an action force ($-f$) that is opposite to the seek drive force ($f_s$). The force ($-f$) is an internal force, therefore (f) responsive to the force ($-f$) a reaction force is generated in the carriage member (s).

In the optical recording/reproducing apparatus, the number of turns of the seek coil 5 wound around the bobbin 3, and the magnetic force of each of the seek adjust and focus adjust permanent magnets 10 and 30 are previously adjusted so as to satisfy the following condition:

$$f = f_s \cdot M/(m+M)$$

where m indicates the mass of the movable focus adjusting member, and M indicates the mass of the carriage member. In the present embodiment, the carriage (s) is driven by the force ($-f$) or the reaction force (f) directly acting on the carriage member (s) without the seek drive force acting on the seek coil. Therefore, a resonance phenomenon can be prevented that may occur in the seek control and the tracking control.

The lens holder 2 and the carriage body 7 are coupled into a unit by filling the gap therebetween with the magnetic fluid (Lq) absorbing resonance of the lens holder 2 and the carriage body 7. Accordingly, the resonance phenomenon can reliably be absorbed.

With such an arrangement, the movable focus adjusting member (p) and the carriage member (s) can be moved as a unit irrespective of a frequency of the current fed to the seek coil 5. Additionally, this ensures exact and reliable controls of seek and tracking operations.

Figure 12:
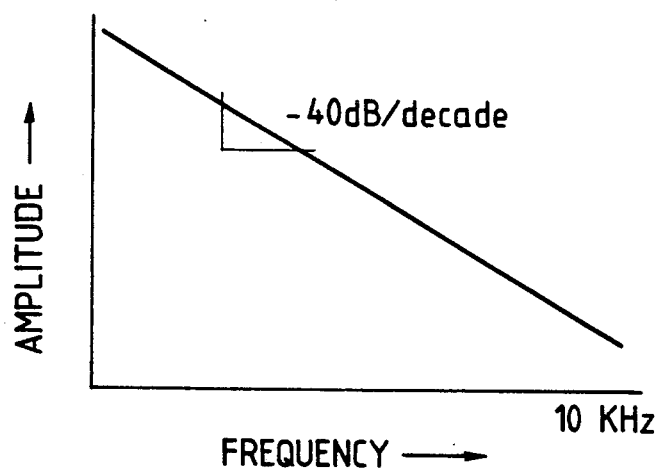
FIG. 12 is a graph showing a relationship between an amplitude and frequency of a vibration of the movable focus adjusting member (p) in the seek direction.
Figure 13:
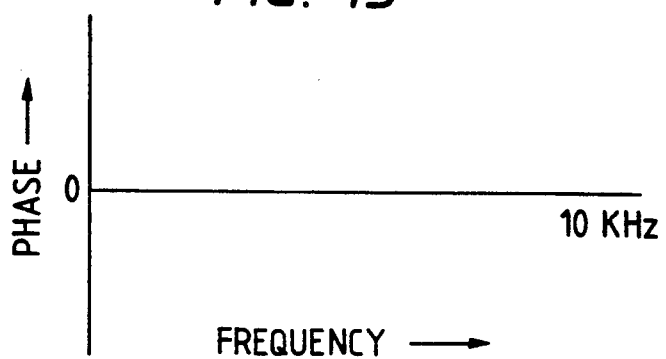
FIG. 13 is a graph showing a relationship between a phase and frequency of a vibration of the movable focus adjusting member (p).

FIG. 12 is a graph showing an amplitude and frequency of a vibration of the movable focus adjusting member (p) in the seek direction when the movable focus adjusting member (p) and the carriage member (s) are vibrating. FIG. 13 is a graph showing a phase and frequency of a vibration of the movable focus adjusting member (p) when the movable focus adjusting member (p) and the carriage member (s) are vibrating. Those graphs show that no resonance phenomenon occurs.

As described above, this first embodiment has the internal force generating means provided between the carriage member and the movable focus adjusting member. The carriage member is driven by utilizing an action force or a reaction force as an internal force, not the seek drive force acting on the movable focus adjusting member. Therefore, the resonance can be prevented irrespective of a frequency value of the current fed to the seek coil. The lens holder and the carriage body are coupled into a unit by filling the gap therebetween with the magnetic fluid absorbing resonance of the lens holder and the carriage body. Accordingly, the resonance phenomenon can reliably be absorbed.

Accordingly, the movable focus adjusting member and the carriage member can be moved as a unit irrespective of a frequency of the current fed to the seek coil. Additionally, this ensures exact and reliable controls of seek and tracking operations.

Second embodiment

Figure 14:
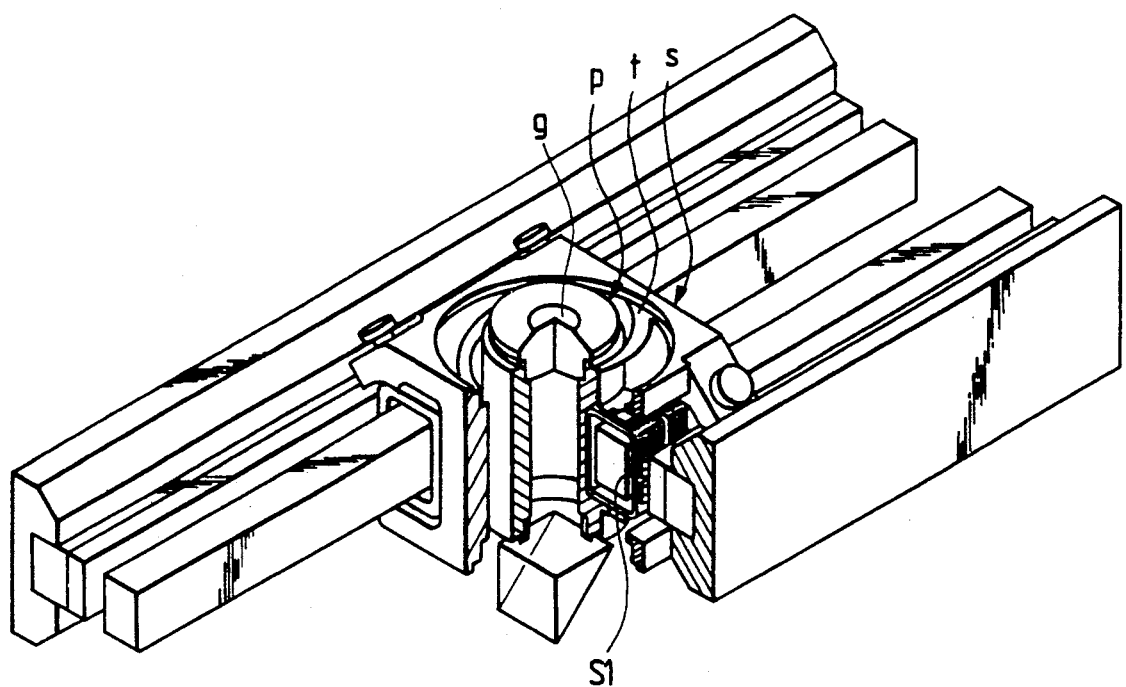
FIG. 14 is a partially broken perspective view of the second embodiment of the optical recording/reproducing apparatus, which is provided with a first seek coil and a second seek coil.
Figure 15:
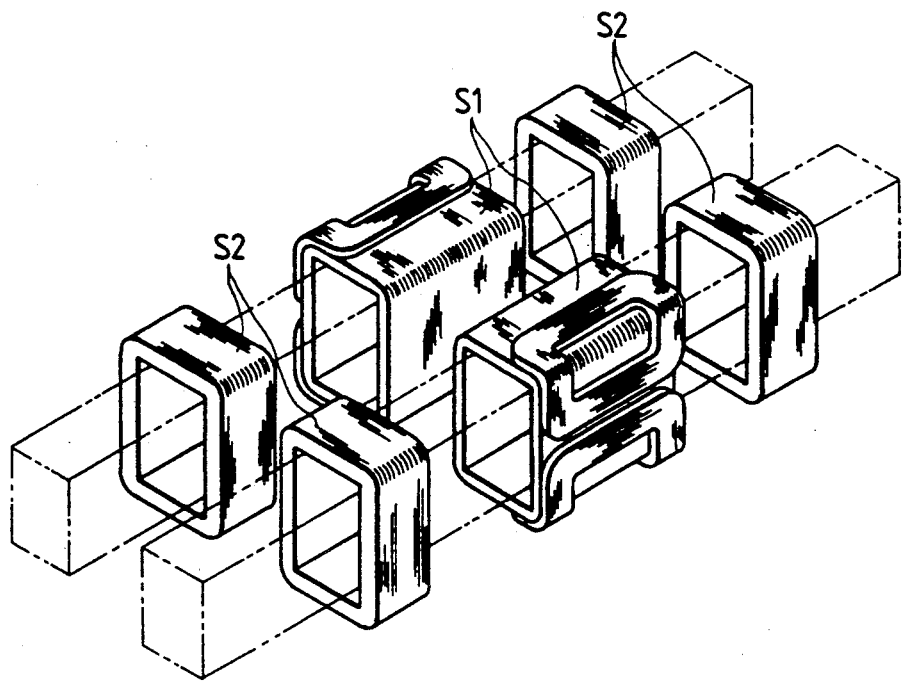
FIG. 15 shows a partial perspective view showing relative positions of a first seek coil and a focus coil as installed and an endless magnetic yoke in a carriage member.

Next a second embodiment of the present invention will be described. An optical recording/reproducing apparatus, first and second seek coils (s1, s2) are assembled into the movable focus adjusting member (p) and the carriage member (s), respectively, as shown in FIGS. 14 and 15.

Figure 16:
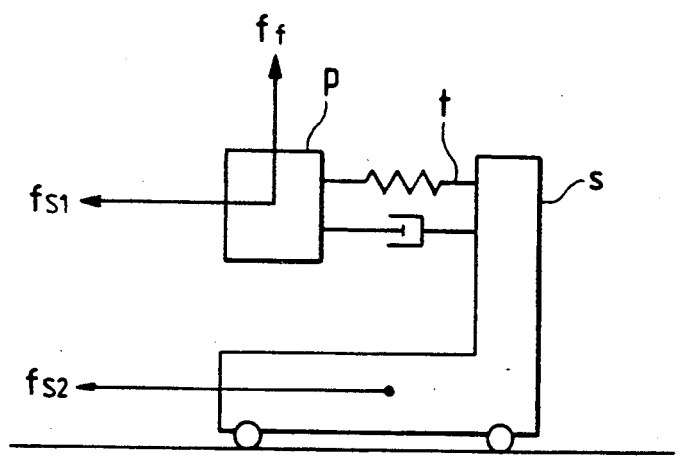
FIG. 16 is a mechanical equivalent diagram of the instant apparatus.
Figure 17:
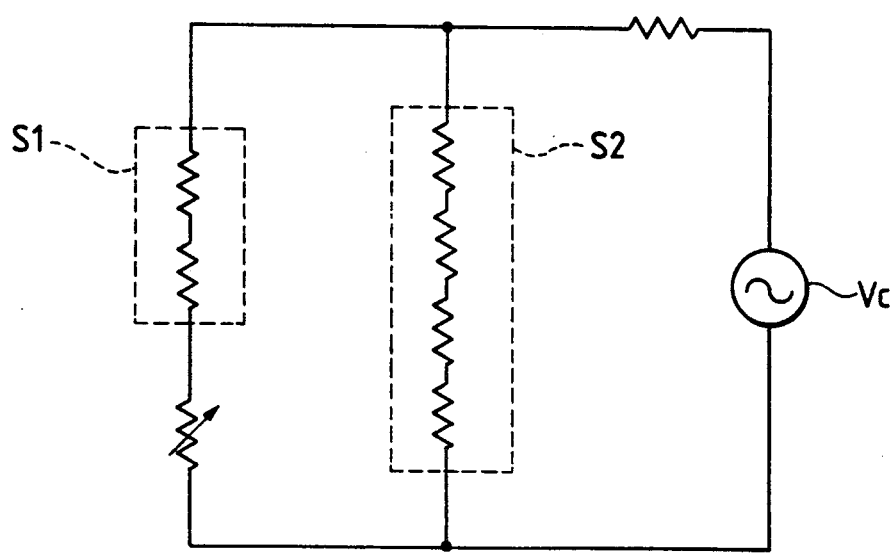
FIG. 17 is a circuit diagram for feeding current to the first and second seek coils.

In the optical recording/reproducing apparatus, as shown in FIG. 16, a first seek drive force ($f_{s1}$) directly acts on the movable focus adjusting member (p), while a second seek drive force ($f_{s2}$) directly acts on the carriage member (s). Therefore, there is no need for transferring the seek drive force to the carriage member (s) through the plate spring (t). Accordingly, the resonance phenomenon can be prevented irrespective of a frequency of the current fed to the first seek coil (s1) and the second seek coil (s2).

Figure 18:
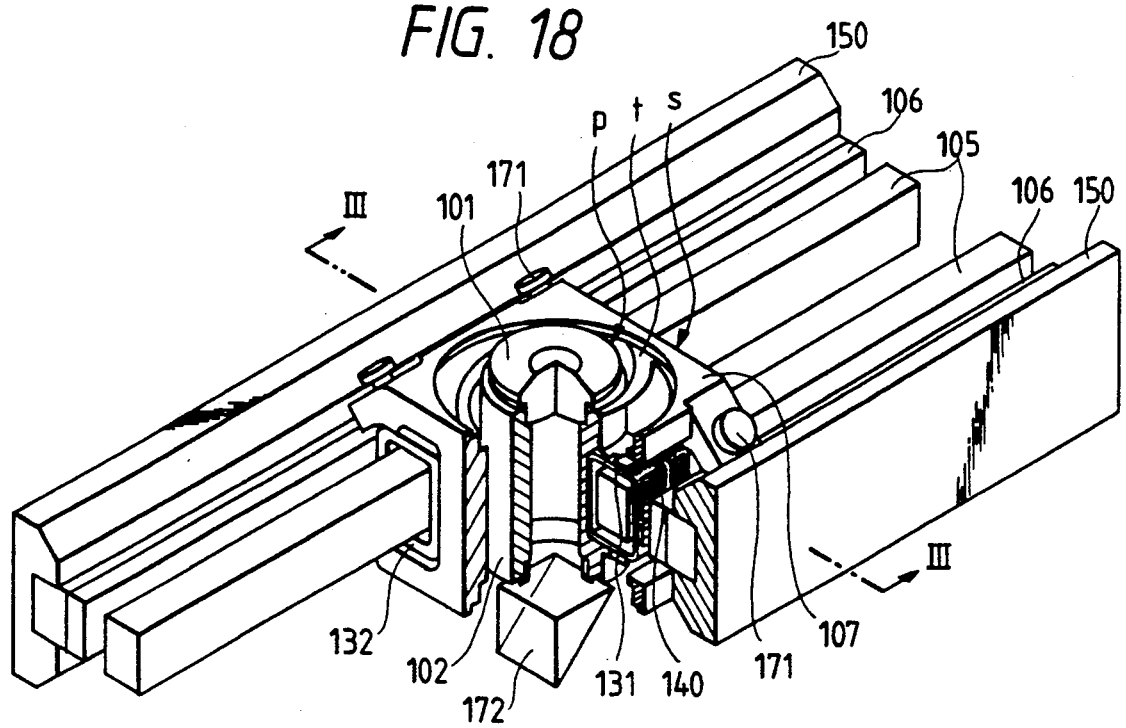
FIG. 18 is a partially broken perspective view of an optical recording/reproducing apparatus according to a third embodiment of the present invention.

However, in the optical recording/reproducing apparatus, when the first and second seek coils (s1, s2) are connected in parallel, and the single drive circuit feeds current to those seek coils, as shown in FIG. 18, the phases Uc) of the currents flowing through the first and second seek coils (s1, s2) tend to shift one from other. This possibly cause the resonance phenomenon.

Where the first and second seek coils (s1, s2) form a closed circuit, when currents of those seek coils change due to a tracking error signal, counter electromotive forces are generated in the seek coils due to self-induction. Since the resistance values of those coils are different, the counter electromotive forces are also different, to cause the phase shift of the currents of those coils.

With the phase shift, motion timings of the movable focus adjusting member and the carriage member also tend to stagger and to cause the resonance.

Third embodiment

A third embodiment of the resent invention, as described hereinbelow provides certain advantages over the second embodiment.

In the third embodiment of the present invention, the first drive circuit for feeding current to the first seek coil and the second drive circuit for feeding current to the second seek coil are provided, to prohibit a closed circuit including those seek coils from being formed. Therefore, no phase shift will occur in the currents flowing through the seek coils, and the first and second seek coils are connected in series and to the single drive circuit. The currents flowing through those coils are equal, thus eliminating the phase shift.

To prevent the resonance by moving the movable focus adjusting member and the carriage member in a unit fashion, a ratio $((f_{s1})/(f_{s2}))$ of a first drive force $(f_{s1})$, and a second drive force $(f_{s2})$, which respectively act on the movable focus adjusting member and the carriage member when current is fed to the first and second seek coils, must be equal to a weight ratio $(m/M)$ of the movable focus adjusting member (whose weight is "m") and the carriage member (whose weight is "M"). Mathematically, a relation $f_{s1}/f_{s2}=m/M$ must hold. In the third embodiment having two drive circuits this realized by properly adjusting the number of turns of each seek coil, an amplitude of the current fed to each seek coil, and a magnetic force of each seek adjust magnet. On the other hand, with the single drive circuit, the amplitudes of the currents fed to the seek coils cannot be separately adjusted. In this case, the number of turns of each seek coil and the magnetic force of the seek adjust magnet are adjusted for realizing the same.

For the focus coil and the first seek coil provided with the movable focus adjusting member and the second seek coil provide with the carriage member, a focus adjust magnet and a seek adjust magnet must be disposed for generating magnetic lines of force directed to those coils. Those magnetic lines of force may be generated by a single magnet. This reduces the number of required parts, and hence reduces size reduction of the resultant apparatus, and magnetic fluid fills a gap between the movable focus adjusting member and the carriage member.

In assembling the movable focus adjusting member and the carriage member into an optical recording/reproducing apparatus, limits of configuring the movable focus adjusting member and the carriage member, and limit of working accuracy sometimes cause a non-uniform gap between the movable focus adjusting member and the carriage member. Even if the first and second seek coils are installed in the movable focus adjusting member and the carriage member, the resonance sometimes occurs due to the non-uniform gap. The magnetic fluid absorbs the resonance of the carriage member and the focus adjust portion to couple them into a unit and hence to reliable eliminate the resonance.

In assembling the movable focus adjusting member and the carriage member into an optical recording/reproducing apparatus, limits of configuring the focus adjust movable part and the carriage member, and limit of working accuracy sometimes cause a non-uniform gap between the movable focus adjusting member and the carriage member. Even if the first and second seek coils are respectively installed in the movable focus adjusting member and the carriage member, a resonance sometimes occur due to the non-uniform gap.

To cope with this problem, it is suggestible to fill the gap with magnetic fluid. This magnetic fluid may be composed of fluid, such as alkyl naphthalene, synthetic oil, and paraffin and magnetic particles, such as $Fe_3O_4$, ferromagnetic metal, and ferromagnetic alloy. "MARPOMAGNA" may be used for the magnetic liquid. The permanent magnet mounted on the carriage member or the movable focus adjusting member is available for holding the magnet liquid.

Figure 19:
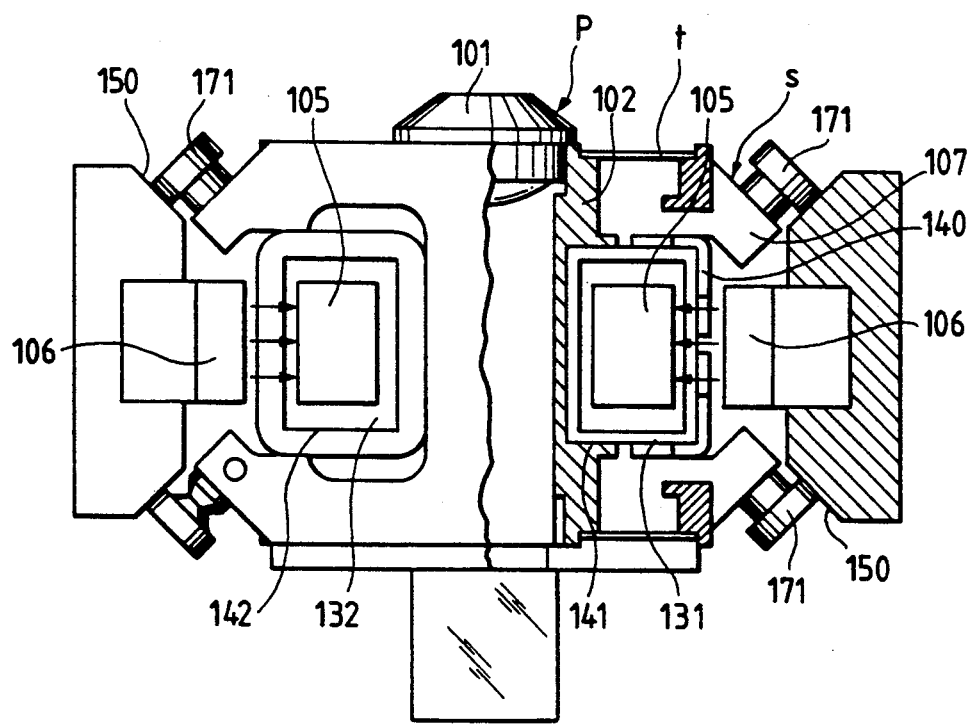
FIG. 19 is a cross sectional view taken on line III—III in FIG. 19.
Figure 20:
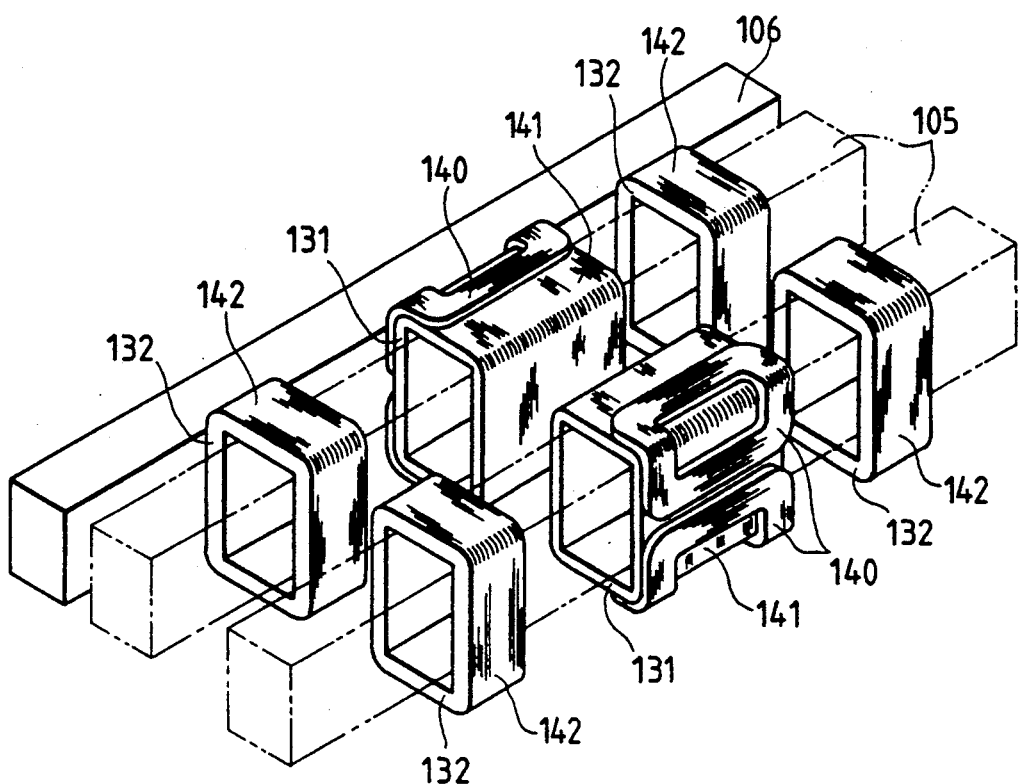
FIG. 20 shows a partial perspective view showing relative positions of a first seek coil and a focus coil as installed in a movable focus adjusting member, and a second seek coil in a carriage member.

As shown in FIGS. 18 through 20, an optical recording/reproducing apparatus according to a third embodiment of the present invention is composed of a movable focus adjusting member (p), a carriage member (s) carrying the movable portion (p), a plate spring (t) coupling the carriage member(s) with the movable portion (p).

The movable focus adjusting member (p) is made up of an objective lens 101, a tubular lens holder 102 holding the objective lens 101, a pair of bobbins fit around in the circumferential surface of the lens holder 102, a first seek coil 131 wound around the paired bobbins 131, and a focus coil 140 boned on the first seek coil 141. Those components are assembled into a unit. Within each bobbin 131, a center yoke 105 is disposed in the radial direction of an optical recording medium (not shown). The first seek coil 141 is wound around the outer surface of each bobbin 131. A permanent magnet 106, which generate magnetic lines of force directed toward the focus coils 140, is disposed along each center yoke 105.

the carriage member (s) is composed of a carriage body 107 whose top and bottom faces are opened, bobbins 132 mounted to the front and rear end portions of the carriage 107, and second seek coils 142 around the bobbins 132. The center yoke 105 is inserted into the tubes of the bobbins 132. Bearings 171 are mounted to the four corners of the carriage body 107. The bearings engage rails 150 disposed in parallel to the center yokes 105, to allow the carriage member (s) to move in the radial direction of an optical recording medium.

The plate spring (t) is constructed with a spiral metal member. The plate spring (t) is mounted at the inner side on the lens holder 2 in the movable focus adjusting member (p), while it is mounted at the outer side on the top and bottom opening portions of the carriage body 7 in the carriage member (s). With the aid of the plate spring (t), the movable focus adjusting member (p) is vertically movable.

Figure 21:
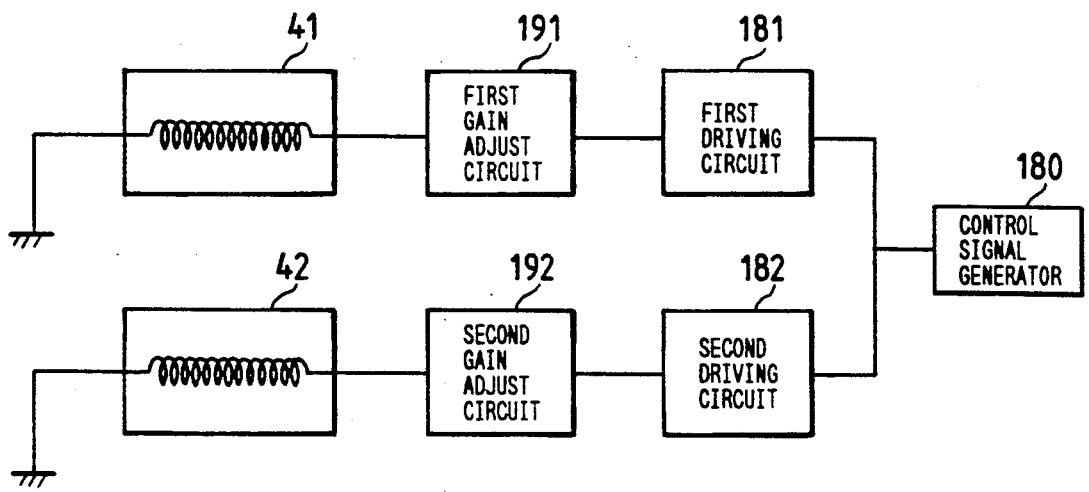
FIG. 21 is a circuit diagram for feeding current to the first and second seek coils.

As shown in FIG. 21, a first drive circuit 181 is coupled with the first seek coil 141 in the focus adjust portion (p). A second drive circuit 182 is coupled with the second seek coil 142 in the carriage member (s).

Namely, the first and second drive circuits 181 and 182 are connected together to a control signal generator 180, which is for generating a tracking error signal and a seek control signal. A first gain adjust circuit 191 is connected between the first drive circuit 181 and the first seek coil 141. A second gain adjust circuit 192 likewise is connected between the second drive circuit 182 and the second seek coil 142. The gain adjust circuits 191 and 192 are used for adjusting amplitude value of currents fed from the first and second drive circuits 181 and 182, respectively. A first drive force $(f_{s1})$ and a second drive force ($f_{s2}$), which act on the movable focus adjusting member (p) and the carriage member (s), are respectively adjusted by the first and second gain adjust circuits 191 and 192.

In the optical recording/reproducing apparatus thus arranged, convergent bundle of light beams emitted from a light source (not shown) located outside the main body of the apparatus is incident on an objective lens 101 through a reflecting prism 172, and is focused on a focusing plane of an optical recording medium (not shown), thereby to effect the recording, reproducing and erasing of data in connection with the recording medium.

Figure 22:
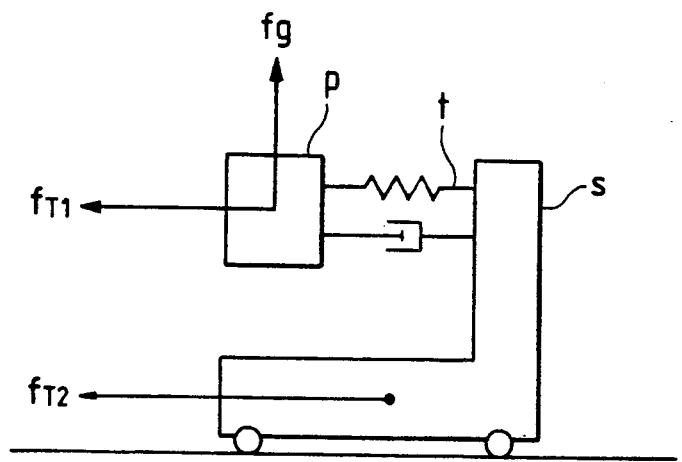
FIG. 22 is a mechanical equivalent diagram of the instant apparatus.

In the optical recording/reproducing apparatus, when current is fed from the first and second drive circuits 181 and 182 to the first and second seek coils 141 and 142, a magnetic force generated by the permanent magnet 106 acts on the first and second seek coils 141 and 142, which are wound around the bobbins 131 and 132. As a result, as shown in FIG. 22 showing a mechanical equivalent circuit, a first drive force ($f_{T1}$) acts on the movable focus adjusting portion (p), and a second drive force ($f_{T2}$), acts on the carriage member (s). By the drive forces, the seek control and the tracking control are exercised. When current is fed to the focus coil 140, the magnetic force by the permanent magnet 106 acts on the focus coil 140. As a result, a focus driven force ($f_g$) acts on the movable focus adjusting member (p), as shown in FIG. 22. The focus control is exercised by the focus drive force.

In the seek control mode and in the tracking control mode, the first drive force ($f_{T1}$) acts on the movable focus adjusting member (p), while the second drive force ($f_{T2}$) acts on the carriage member (s). Through the operations of the amplifier 191 inserted between the first drive circuit 181 and the first seek coil 141, and the amplifier 192 inserted between the second drive circuit 182 and the second seek coil 142, the apparatus is set up so that a ratio of the first and second drive forces ($f_{T1}$) and ($f_{T2}$) satisfies the following relation:

$$(f_{T1})/(f_{T2}) = m/M$$

where m is the mass of the movable focus adjusting member, and M is the mass of the carriage member. The resonance phenomenon can be prevented without transferring a seek drive force through the plate spring (t) to the carriage member, because the movable focus adjusting member (p) and the carriage member (s) are moved in a unit fashion.

Further, the first drive circuit 181 for feeding current to the first seek coil 141 and the second drive circuit 182 for feeding current to the second seek coil 142 are provided. No closed circuit is formed between the first and second seek coils 141 and 142. No phase shift occurs in the current fed to each of the seek coils 141 and 142. This feature additionally contributes to prevent the resonance phenomenon of the movable focus adjusting member (p) and the carriage member (s).

Accordingly, the movable focus adjusting member (p) and the carriage member (s) can be simultaneously moved irrespective of a frequency of the current fed to each of the seek coils 141 and 142. Reliable seek and tracking controls are ensured.

Figure 23:
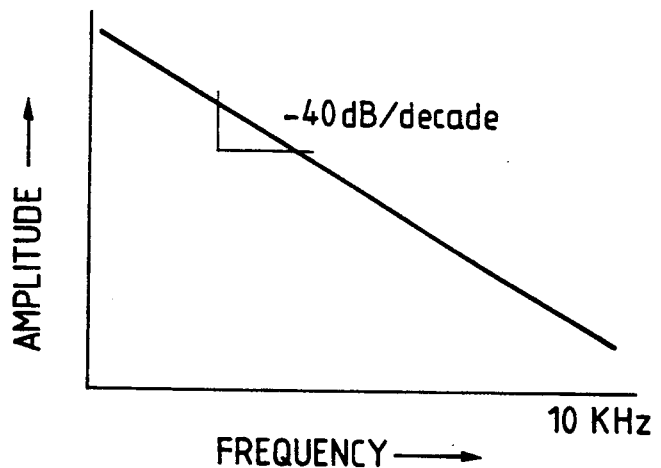
FIG. 23 is a graph showing a relationship between amplitude and frequency of a vibration of the movable focus adjusting member in the seek direction.
Figure 24:
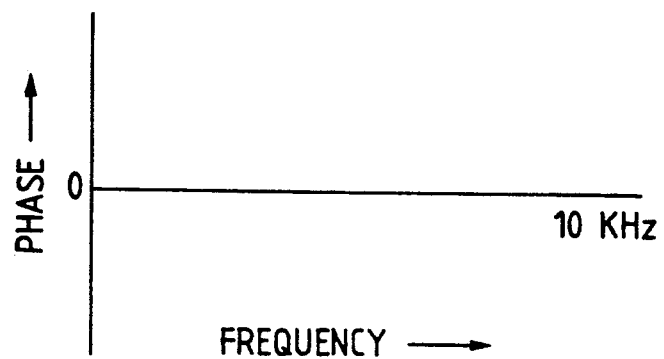
FIG. 24 is a graph showing a relationship between phase and frequency of a vibration of the movable focus adjusting member in the seek direction.

FIG. 23 is a graph showing a relationship between an amplitude and frequency of an vibration of the movable focus adjusting member (p) when the movable focus adjusting member (p) and the carriage member (s) are vibrating. FIG. 24 is a graph showing a relationship between phase and frequency of an vibration of the movable focus adjusting member (p) when the movable focus adjusting member (p) and the carriage member (s) are vibrating. As seen from those graphs, no resonance phenomenon occurs.

Further, in the apparatus, the relation $(f_{s1})/(f_{s2}) = m/M$ can readily be set up by adjusting the amplifiers 191 and 192, which are respectively located between the seek coils 141 and 142 and the drive circuits 181 and 182 after assembled. For this reason, the number of turns of the seek coils 141 and 142, and the magnetic force of the permanent magnets 106 may be set to desired values. Therefore, the assembling work is simple and easy. The magnetic lines of force directed toward the focus coils 140 and the first seek coils 141 in the movable focus adjusting member (p), and the magnetic lines of force toward the second seek coils 142 in the carriage member (s) are generated by a pair of permanent magnets 106. This leads to reduction of the number of required parts, and hence reduction of the apparatus size.

Forth embodiment

A forth embodiment according to the present invention is different from the third embodiment in that magnetic fluid is used to fill a gap between the movable focus adjusting member (p) and carriage member (s), and in a current feed system for feeding current to the first and second seek coils mounted on the movable focus adjusting member (p) and the carriage member (s).

Figure 25:
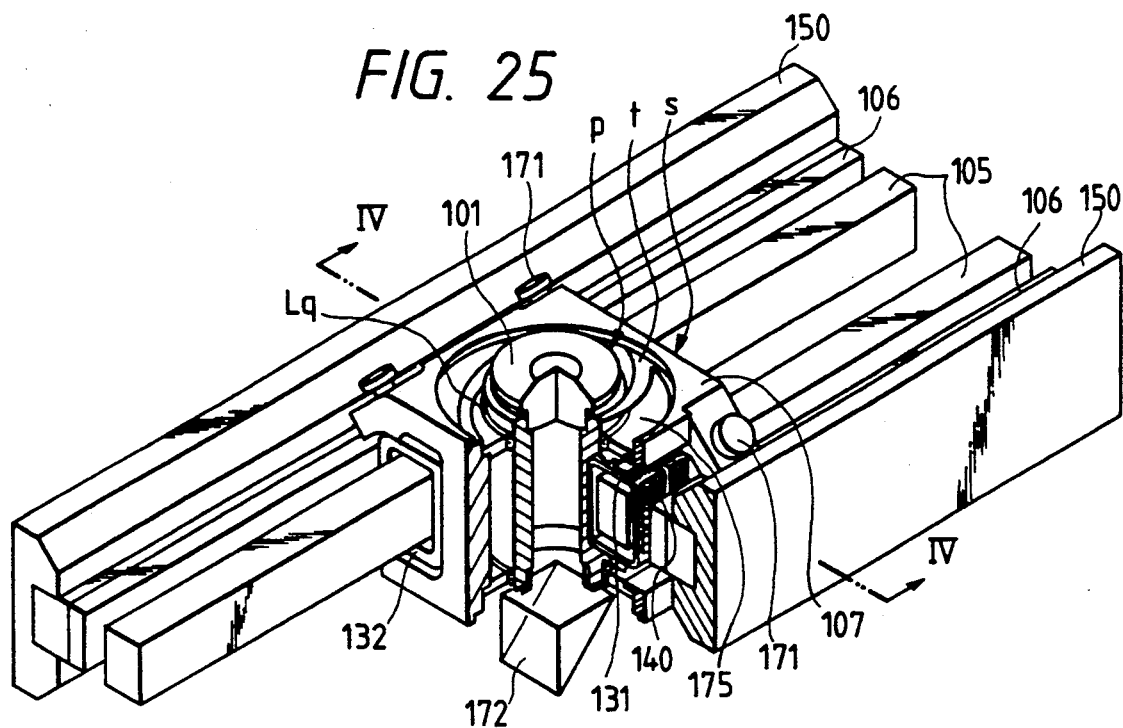
FIG. 25 is a partially broken perspective view of an optical recording/reproducing apparatus according to a fourth embodiment of the present invention.
Figure 26:
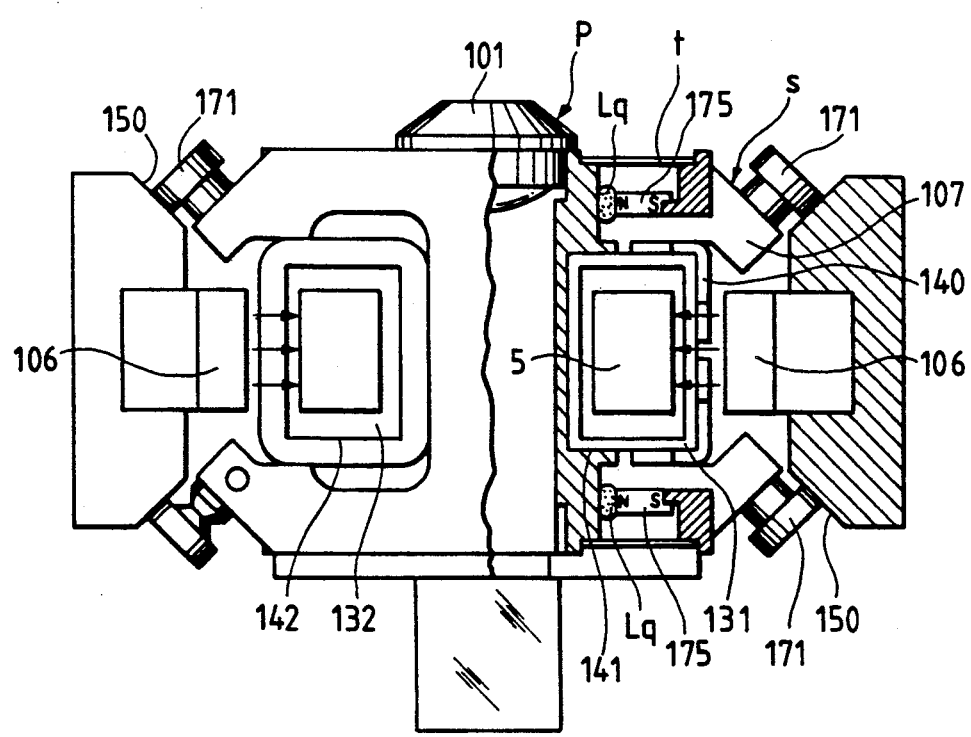
FIG. 26 is a sectional view taken on line IV—IV in FIG. 25.

As shown in FIGS. 25 and 26, an optical recording/reproducing apparatus according to forth embodiment of the present invention is composed of a movable focus adjusting member (p), a carriage member (s) carrying the movable portion (p), a plate spring (t) coupling the carriage member (s) with the movable portion (p), and magnetic fluid (Lq) filling a gap between the carriage member (s) and the movable focus adjusting member (p).

Figure 27:
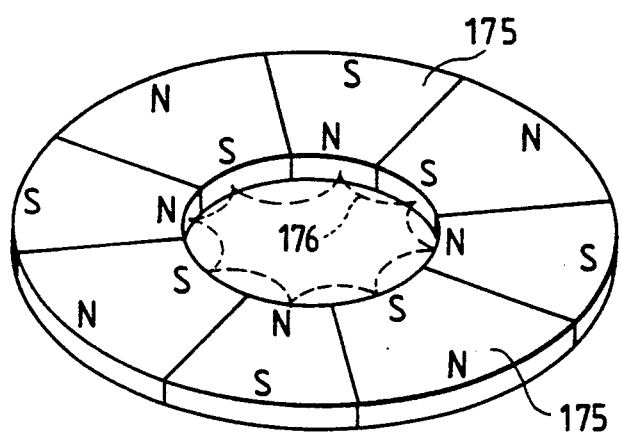
FIG. 27 shows a perspective view of a permanent magnet group holding magnetic fluid.

A group of permanent magnets 175 to 175, which are arranged in a ring fashion as shown in FIG. 27, is fitted in each of the top and bottom opening portions of the carriage member (s). The magnet fluid (Lq) is attracted and held by the permanent magnet groups 175 to 175. As shown, those permanent magnets are disposed alternately in terms of polarity. The magnet liquid (Lq) is held along the magnetic lines of force as formed among the permanent magnets 175 to 175, while filling the gap between the lens holder 102 in the movable focus adjusting member (p) and the carriage body 107. "MARPOMAGNA" may be used for the magnetic fluid (Lq).

Figure 28:
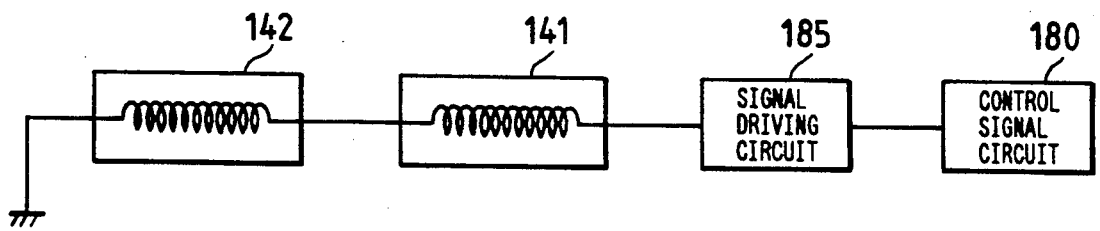
FIG. 28 is a circuit diagram for feeding current to the first and second seek coils, and the wire conductor.

The first and second seek coils 141 and 142 mounted on the movable focus adjusting member (p) and the carriage member (s), as shown in FIG. 28, are connected to a single drive circuit 185 in series, which is for feeding current to those seek coils 141 and 142. In FIG. 28, reference numeral 180 designates a control circuit for producing a tracking error signal and a seek control signal.

Also in the instant embodiment, in the seek control mode and in the tracking control mode, the first drive force ($f_{T1}$) acts on the movable focus adjusting member (p), while the second drive force ($f_{T2}$) directly acts on the carriage member (s).

By appropriately adjusting the number of turns of each of the first and second seek coils 141 and 142, and a magnetic force of each of the permanent magnets that act on those seek coils, the apparatus is set up so that a ratio of the first and second drive forces ($f_{T1}$) and ($f_{T2}$) satisfies the following condition:

$$(f_{T1})/(f_{T2})=m/M$$

where m is the mass of the movable focus adjusting member, and M is the mass of the carriage member. The resonance phenomenon can be prevented without transferring a seek drive force through the plate spring (t) to the carriage member, because the movable focus adjusting member (p) and the carriage member (s) are moved in a unit fashion.

In the optical recording/reproduction apparatus of the instant embodiment, the first and second seek coils 141 and 142 are connected in series to the single drive circuit 85. Accordingly, the same current flow through those seek coils, with no shift of phase. Therefore, the fourth embodiment can reliably prevent the resonance of the movable focus adjusting member (p) and the carriage member (s).

Further, the magnetic fluid (Lq), which fills the gap between the lens holder 102 and the carriage body 107, absorbs resonance in those components, and unifies them. This feature also contributes to prevent the resonance.

Thus, the movable focus adjusting member (p) and the carriage member (s) can be moved in a unit fashion irrespective of a frequency value of the current fed to the first and second seek coils 141 and 142. Consequently, an exact tracking control is ensured.

As described above in detail, the first drive circuit for feeding current to the first seek coil and the second drive circuit for feeding current to the second seek coil are provided, to prohibit a closed circuit including those seek coils from being formed. Therefore, no phase shift will occur in the currents flowing through the seek coils.

Further, the first and second seek coils are connected in series and to the single drive circuit. The currents flowing through those coils are equal, eliminating the phase shift.

Furthermore, a ratio of a first drive force and a second drive force, which respectively act on the movable focus adjusting member and the carriage member when current is fed to the first and second seek coils, is equal to a weight ratio of the movable focus adjusting member and the carriage member. This feature prevents a resonance of the movable focus adjusting member and the carriage member.

Moreover, magnetic fluid fills a gap between the movable focus adjusting member and the carriage member. The magnetic fluid absorbs the resonance of the carriage member and the focus adjust portion to couple them into a unit and hence to reliable eliminate the resonance.

Since the movable focus adjusting member and the carriage member are moved in a unit fashion, an exact and reliable tracking control is realized.

Fifth embodiment

Next a fifth embodiment of the present invention will be described. An optical recording/reproducing apparatus, first and second seek coils (s1, s2) are assembled into the movable focus adjusting member (p) and the carriage member (s), respectively, as shown in FIGS. 29 and 30.

Figure 31:
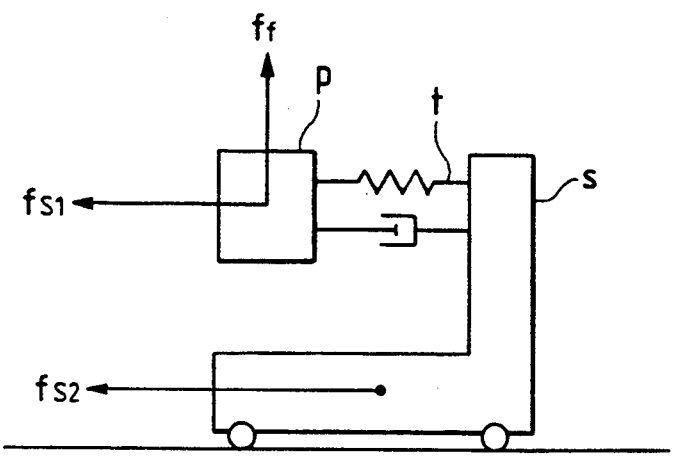
FIG. 31 is a mechanical equivalent diagram of the instant apparatus.

In the optical recording/reproducing apparatus, as shown in FIG. 31, a first seek drive force ($f_{s1}$) directly acts on the movable focus adjusting member (p), while a second seek drive force ($f_{s2}$) directly acts on the carriage member (s). Therefore, there is no need for transferring the seek drive force to the carriage member (s) through the plate spring (t). Accordingly, the resonance phenomenon can be prevented irrespective of a frequency of the current fed to the first seek coil (s1) and the second seek coil (s2).

Figure 29:
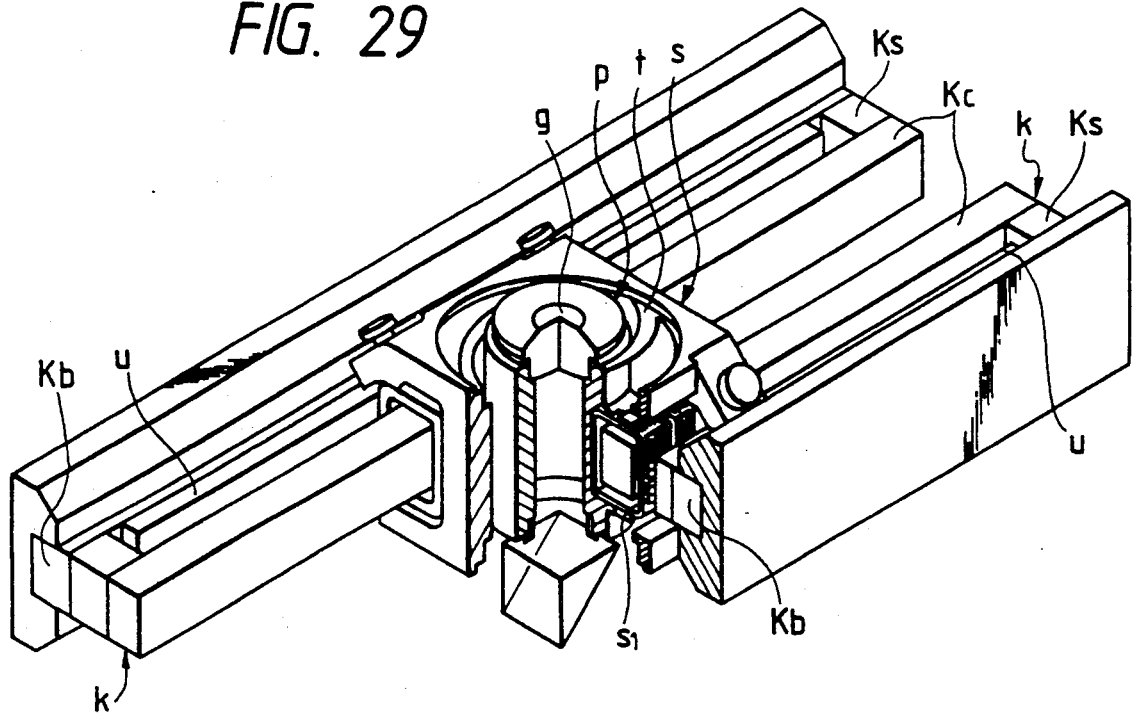
FIG. 29 is a partially broken perspective view of an optical recording/reproducing apparatus according to a fifth embodiment of the present invention.
Figure 30:
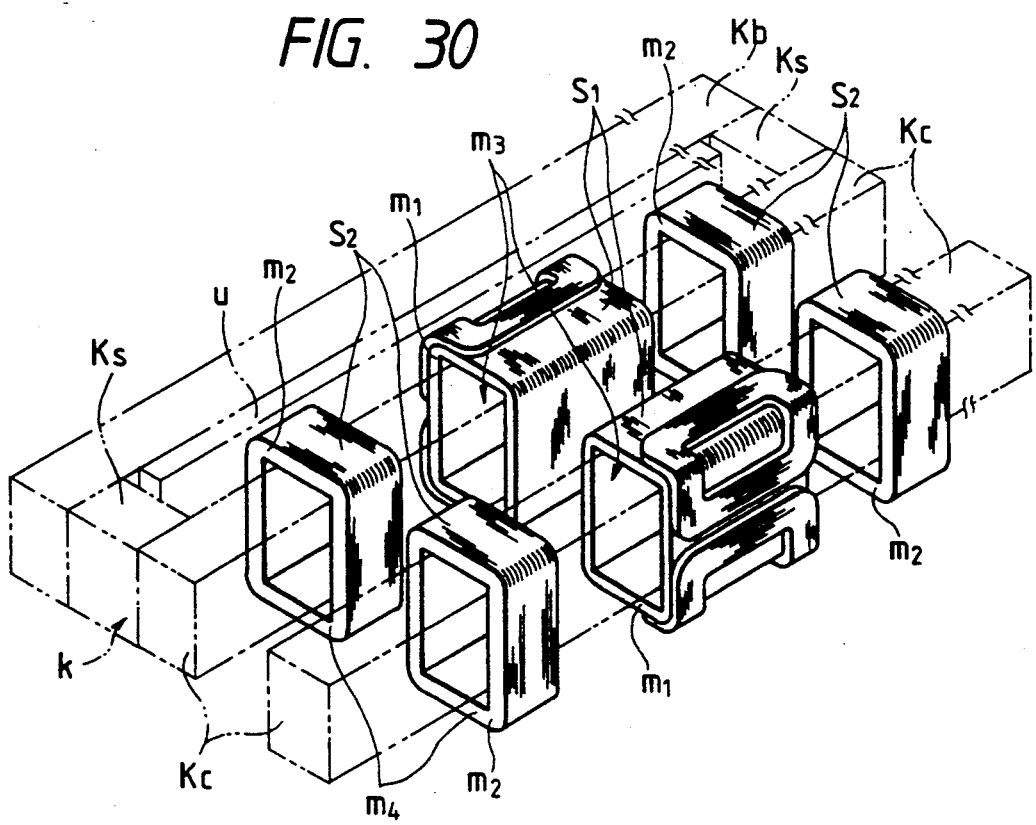
FIG. 30 shows a partial perspective view showing relative positions of a first seek coil and a focus coil as installed in a movable focus adjusting member, and a second seek coil and an endless magnetic yoke in a carriage member.

In the optical recording/reproducing apparatus, as shown in FIGS. 29 to 30 permanent magnets (u) are disposed along a center magnetic yokes (kc) as respectively inserted into a hollows (m3, m4) of first coil support (m1) and second coil support (m2) of the first seek coil (s1) and second seek coil (s2). In this way, a uniform magnetic field is developed toward each of the first seek coil (s1) and the second seek coil (s2). An endless magnetic yoke is formed by the center magnetic yoke (kc), a back magnetic yoke (kb) disposed along the center magnetic yoke (kc), and a pair of side magnetic yokes (ks, ks) which connect the center magnetic yoke (kc) and the back magnetic yoke (kb) at both ends of the center magnetic yoke (kc) and the back magnetic yoke (kb). The endless magnetic yoke (k) prevents a magnetic field from being dispersed, thereby to improve the efficiency of shaping a magnetic field developed from the permanent magnet (u).

With such a structure, when current is fed to the first seek coil (s1) and the second seek coil (s2), magnetic fields are developed by those coils, and magnetize the center magnetic yokes (kc). Then, (kc) develops the uniform magnetic field developed from the permanent magnetic field would distributed by another magnetic field developed by each magnetic yoke (kc). Consequently, the resultant controls of seek and tracking operations are frequently unreliable.

Figure 32:
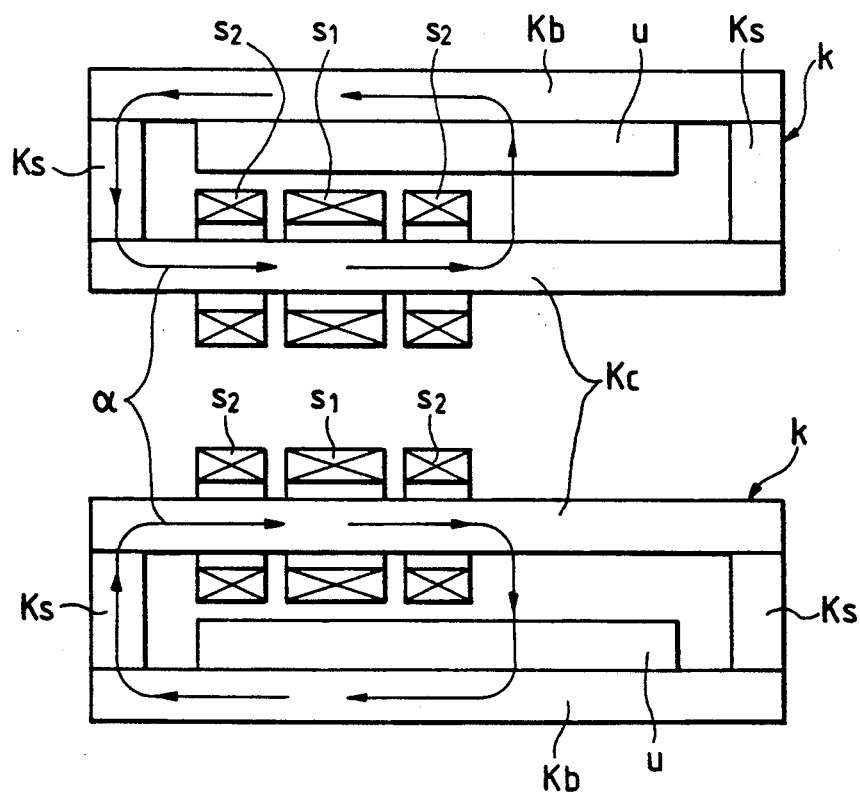
FIG. 32 shows a plan view of FIG. 30.

The magnetic field developed from center magnetic yoke (kc) forms a magnetic circuit ($\alpha$) as shown in FIG. 32. In a region where each magnetic circuit ($\alpha$) is closer to the side magnetic yoke (ks), magnetic lines of force pass through the side magnetic yoke (ks), and therefore little influence the uniform magnetic field of the permanent magnet. In a region where each magnetic circuit ($\alpha$) is not close to the side magnetic yoke (ks), the magnetic lines of force pass through a gap between the center magnetic yoke (kc) and the back magnetic yoke (kb), so as to greatly influence the magnetic field from the permanent magnet. As a consequence, the uniformity of the magnetic field developed from the permanent magnet (u) is lost the center portion of the center magnetic yoke (kc), and in the portion close to the side magnetic yokes (ks). The direction of each yoke side magnetic field is alternately changed as the direction of the current feed of each of the first and second seek coils (s1, s2). The disturbance of the uniform magnetic field by the permanent magnet (u) further becomes worse.

Accordingly, in the center portion of each center magnetic yoke (kc) and in the portions close to the side magnetic yokes (ks, ks), the electromagnetic forces acting on the first seek coil (s1) and the second seek coil (s2) could be changeable. Under this condition, it is very difficult to obtain required mechanical vibration characteristics. The problem of unexact control of seek and tracking operations remains unsolved.

To solve the above problem, a possible measure exists. In the measure, the center magnetic yoke (kc) and the back magnetic yoke (kb) each endless magnetic yoke (k) are made longer. With this, a movable range of the carriage member (s) is limited within the center of the center magnetic yoke (kc) and its near regions. However, this measure creates another problem of increasing a space in which the endless magnetic yoke is disposed, and hence the size of the recording/reproducing apparatus.

Sixth embodiment

A sixth embodiment of the present invention, as described hereinbelow provides certain advantages over the second embodiment.

In feeding current to the first and second seek coils in accordance with a tracking error signal and a seek control signal, if a phase of the current flowing through each seek coil is shift, motion timings of the movable focus adjusting member and the carriage member tend to stagger. In an extreme case, a resonance occurs between the moveable focus adjusting member and the carriage member. To prevent the resonance phenomenon, a first drive circuit for feeding current to the first seek coil and a second drive circuit for feeding current to the second seek coil are provided, so as not form a closed circuit between the first and second seek coils. Alternatively, a single drive circuit for feeding current to the first and second seek coils is provided. Those seek coils are connected in series, thereby to prevent a phase shift of the current.

In setting a first drive force ($f_{s1}$) applied to the movable focus adjusting member, which results from current feed to the first seek coil, and a second drive force ($f_{s2}$) applied to the carriage member, which results from current fed to the second seek coil, in order to more reliably prevent the resonance phenomenon, the following relation must hold:

$$f_{s1}/f_{s2} = m/M$$

where m indicates the mass of the movable focus adjusting member, and M, the mass of the carriage member.

In the recording/reproducing apparatus using two independent drive circuits, first and second drive circuits, for feeding current to the seek coils, the above relation can be satisfied by adjusting the number of turns of each seek coil, amplitude of the current fed to each seek coil, a magnetic force of each seek adjust magnet, and the like. In the apparatus using a single drive circuit, it is impossible to individually adjust the amplitudes of the currents fed to the coils and the like. Accordingly, in this type of the apparatus, the number of turns of each seek coil, and the magnetic force of the seek adjust magnet are adjusted for satisfying the relation.

The focus adjust magnet and the seek adjust magnet must be provided for generating magnetic lines of force toward the focus coil and the first seek coil, which are provided in movable focus adjusting member, and the second seek coil provided in the carriage member. The magnet may be replaced by a single magnet. Use of the single magnet reduces the number of necessary parts, and consequently the size of the resultant apparatus.

In assembling the movable focus adjusting member and the carriage member into an optical recording/reproducing apparatus, limits of configuring the movable focus adjusting member and the carriage member, and limit of working accuracy sometimes cause a non-uniform gap between the movable focus adjusting member and the carriage member. Even if the first and second seek coils are respectively installed in the movable focus adjusting member and the carriage member, a resonance sometimes occurs due to the non-uniform gap.

To cope with this problem it is suggestible to fill the gap with magnetic fluid. This magnetic fluid may be composed of fluid, such as alkyl naphthalene, synthetic oil, and paraffin, and magnetic particles, such as $Fe_3O_4$, ferromagnetic metal, and ferromagnetic alloy. "MARPOMAGNA" may be used for the magnetic liquid. The permanent magnet mounted on the carriage member or the movable focus adjusting member is available for means for holding the magnetic liquid.

Figure 33:
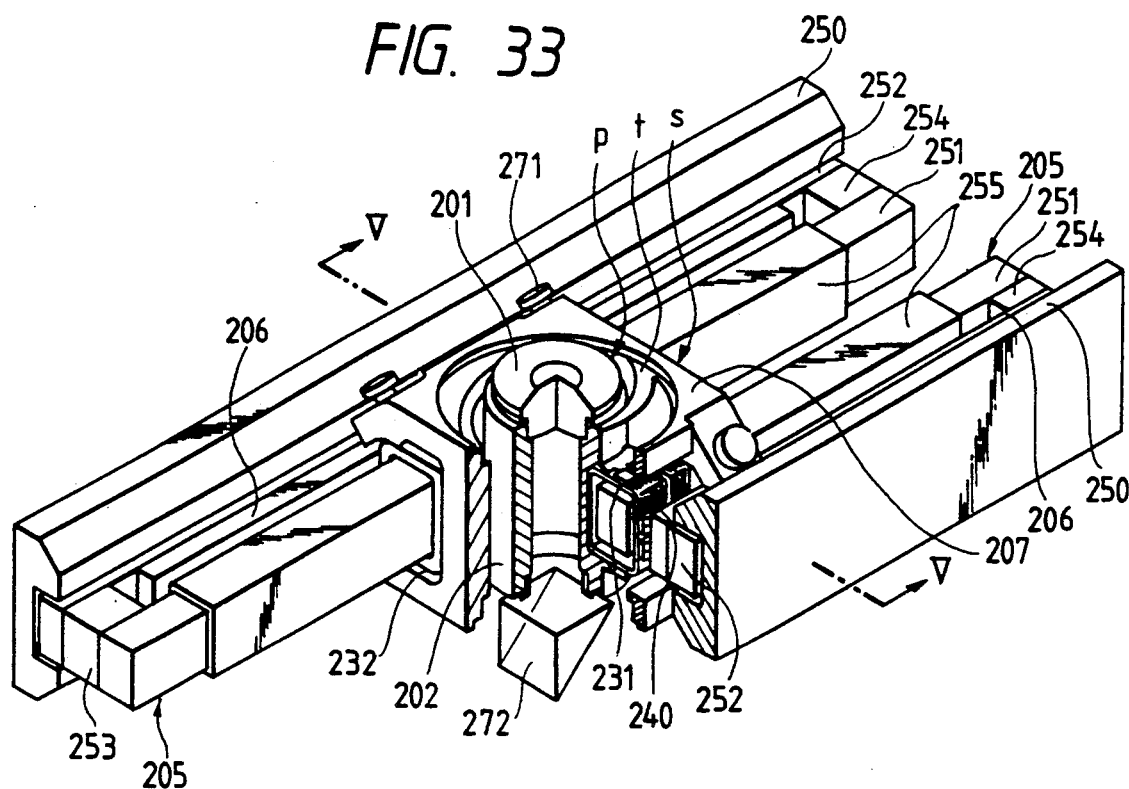
FIG. 33 is a partially broken perspective view of an optical recording/reproducing apparatus according to a sixth embodiment of the present invention.
Figure 34:
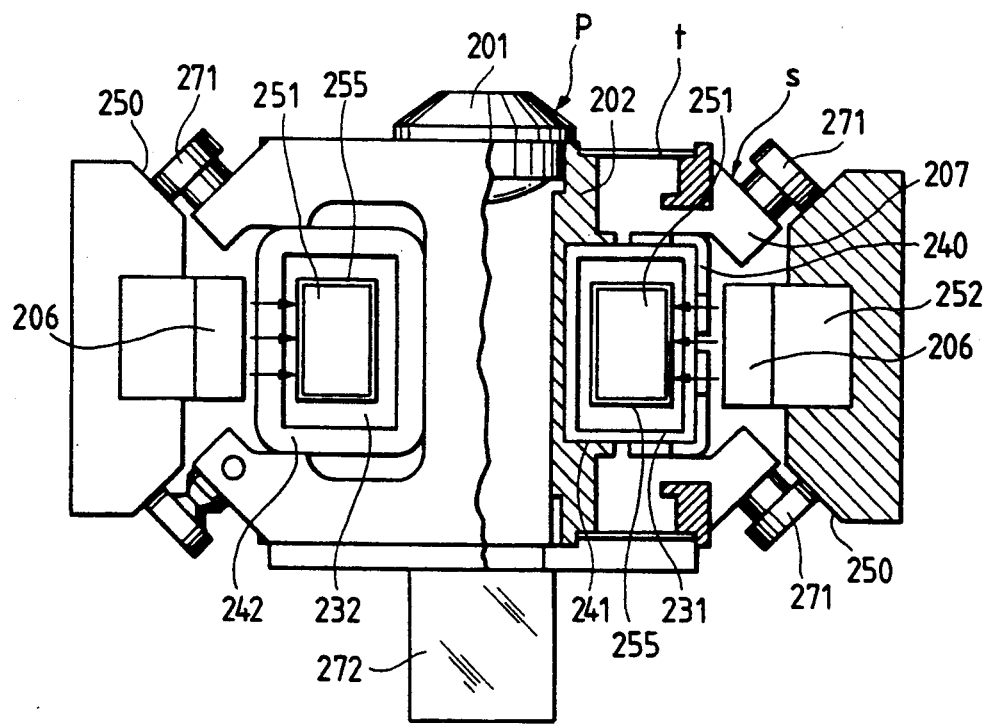
FIG. 34 is a cross sectional view taken on line V—V in FIG. 33.
Figure 35:
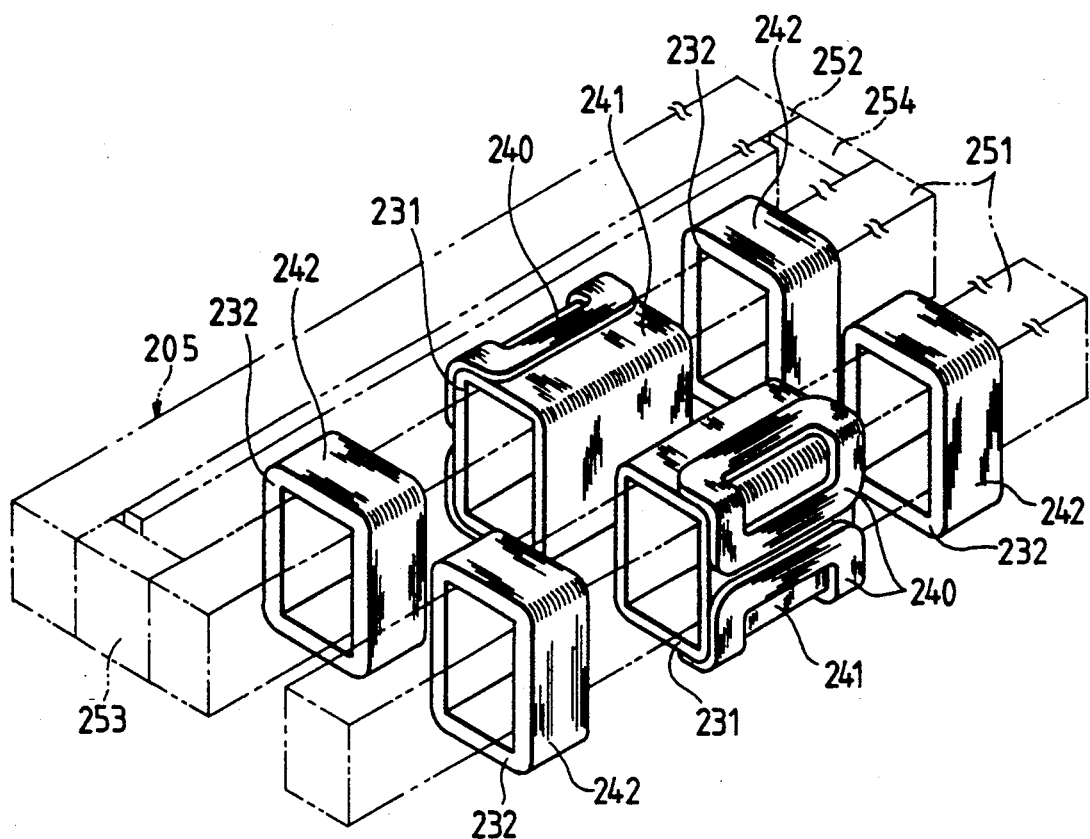
FIG. 35 shows a partial perspective view showing relative positions of a first seek coil and a focus coil as installed in a movable focus adjusting member, and a second seek coil and an endless magnetic yoke in a carriage member.

As shown in FIGS. 33 through 35, an optical recording/reproducing apparatus according to a sixth embodiment of the present invention is composed of a movable focus adjusting member (p), a carriage member (s) carrying the movable focus adjusting member (p), a plate spring (t) coupling the carriage member (s) with the movable focus adjusting member (p), a pair of endless magnetic yokes 205, and a permanent magnet 206.

The movable focus adjusting member (p) is made up of an objective lens 201, a tubular lens holder 202 holding the objective lens 201, a pair of bobbins fitted around in the circumferential surface of the lens holder 202, a first seek coil 231 wound round the paired bobbins 231, and a focus coil 240 bonded on the first seek coil 241. Those components are assembled into a unit.

Each endless magnetic yoke 205 is made up of a center magnetic yoke 251 inserted in the tube of the bobbin 231 with a gap therebetween to allow a focus movement, a back magnetic yoke 252 disposed along the center magnetic yoke 251, and a pair of side magnetic yokes 253 and 254 respectively bridging both ends of the center magnetic yokes 251 and the back magnetic yokes 252. A permanent magnet 206 is disposed on the side of the back magnetic yoke 252, which faces the center magnetic yoke 251, and develops a uniform magnetic filed toward the first and second seek coils 241 and 242. A tubular short ring 255 is fit around the center magnetic yoke 251. The short ring 255 is made of mental, such as copper, and severs as a means for reducing the magnetic field developed when the current is fed.

The carriage member (s) is composed of a carriage body 207 whose top and bottom faces are opened, bobbins 232 mounted to the front and rear end portions of the carriage body 207, and second seek coils 242 around the bobbins 232. The center magnetic yoke 251 is inserted into the tubes of the bobbins 232. Bearing 271 are mounted to the four corners of the carriage body 207. The bearings engage rails 250 disposed in parallel to the center yokes 251, to allow the carriage member (s) to move in the radial direction of an optical recording medium.

The plate spring (t) is constructed with a spiral metal member. The plate spring (t) is mounted at the inner side on the lens holder 202 in the movable focus adjusting member (p), while it is mounted at the outer side on the top and bottom opening portions of the carriage body 207 in the carriage member (s). With the aid of the plate spring (t), the movable focus adjusting member (p) is vertically movable.

Figure 36:
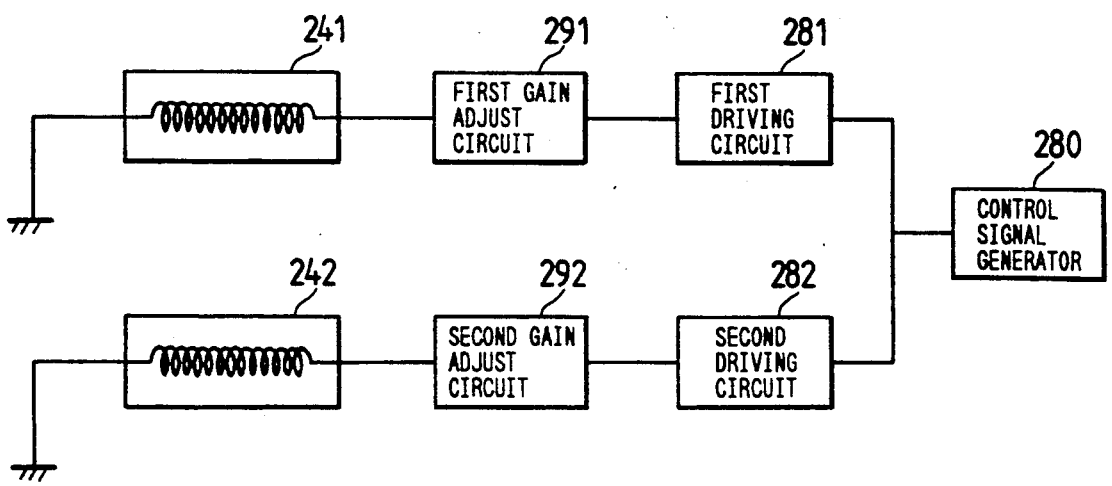
FIG. 36 is a circuit diagram for feeding current to the first and second seek coils.

As shown in FIG. 36, a first drive circuit 281 is coupled with the first seek coil 241 in the focus adjust portion (p). A second circuit 282 is coupled with the second seek coil 242 in the carriage member (s).

Namely, the first and second drive circuits 281 and 282 are connected to a control signals generator 280 in parallel, which is for generating a tracking error signal and a seek control signal. A first gain adjust circuit 291 is connected between the first drive circuit 281 and the first seek coil 241. A second gain adjust circuit 292 likewise is connected between the second drive circuit 282 and the second seek coil 242. The gain adjust circuits 291 and 292 are used for adjusting amplitude value of currents fed from the first and second drive circuits 281 and 282, respectively. A first drive force ($f_{R1}$) and a second drive force ($f_{R2}$), which act on the movable focus adjusting member (p) and the carriage member (s), are respectively adjusted by the first and second gain adjust circuits 291 and 292.

In the optical recording/reproducing apparatus thus arranged, convergent bundle of light beams emitted from a light source (not shown) located outside the main body of the apparatus is incident on an objective lens 201 through a reflecting prism 272, and is focused on a focusing lend plane of an optical recording medium (not shown), thereby to effect the recording, reproducing and erasing of data in connection with the recording medium.

Figure 39:
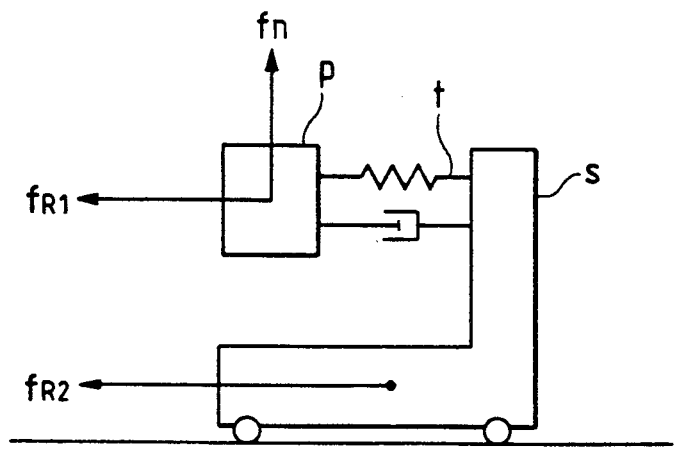
FIG. 39 is a mechanical equivalent diagram of the instant apparatus.

In the optical recording/reproducing apparatus, when current is fed from the first and second drive circuits 281 and 282 to the first and second seek coils 241 and 242, a magnetic force generating by the permanent magnet 6 acts on the first and second seek coils 241 and 242, which are wound around the bobbins 231 and 232. As a result, as shown in FIG. 39 showing a mechanical equivalent circuit, a first drive force ($f_{R1}$) acts on the movable focus adjusting portion (p), and a second drive force ($f_{R1}$), on the carriage member (s). By the drive forces, the seek control and the tracking control are excised. When current is fed to the focus coil 240, the magnetic force by the permanent magnet 6 acts on the focus coil 240. As a result, a focus drive force ($f_n$) acts on the movable focus adjusting member (p), as shown in FIG. 39. The focus control is exercised by the focus drive force.

It is noted that in the optical recording/reproducing apparatus, the short ring 255 as the means for reducing the magnetic fields developed by the current feeding is mounted on the circumstance surface of each center magnetic yoke 251. Therefore, it is possible to prevent the uniform magnetic field by the permanent magnet 206 being deformed when the apparatus is in a seek control mode or in a tracking control mode.

In the seek control mode or the tracking control mode, when current is fed to the first and second seek coils 242 from the first and second drive circuits 281 and 282, magnetic fields are developed from these seek coils 241 and 242. Then, the magnetic fields magnetize the center magnetic yokes 251, which develop additional magnetic fields. Those magnetic fields developed from the center magnetic yokes tend to disturb the uniform magnetic field by the permanent magnet 206.

Figure 37:
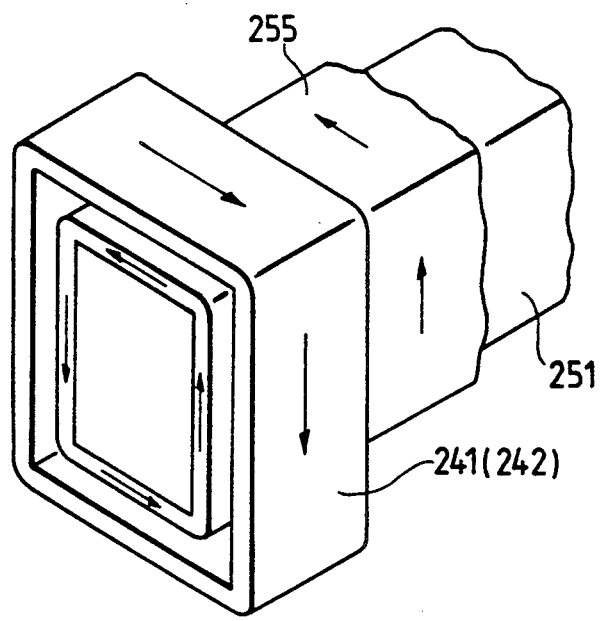
FIG. 37 is a partial expanded view showing a center magnetic yoke, a short ring, and the first and second seek coils.
Figure 38:
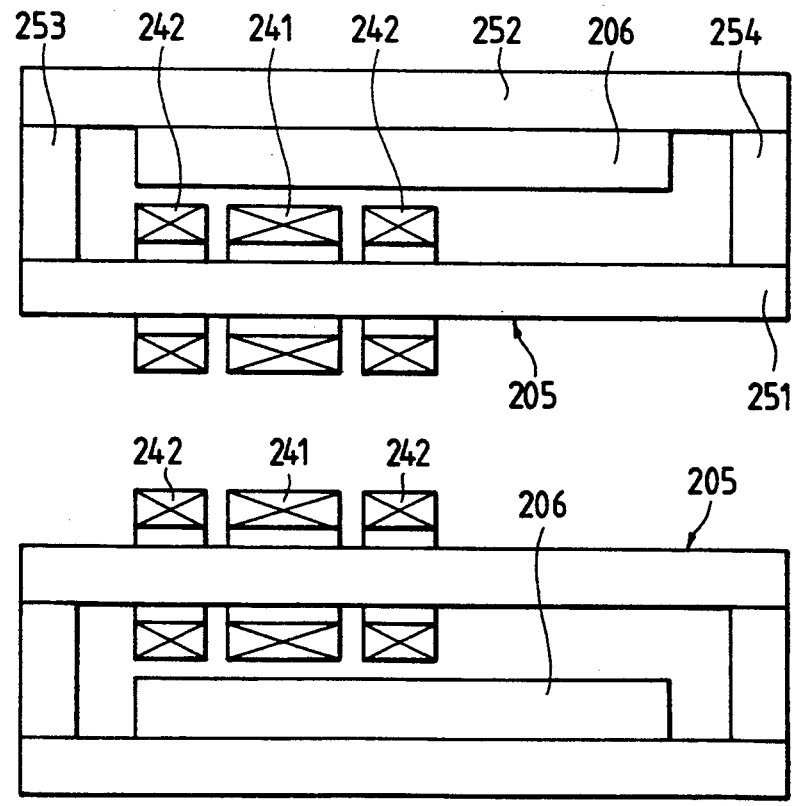
FIG. 38 shows a plan view of FIG. 35.

As described above, the short rings 255 are mounted on the center magnetic yokes 251. Accordingly, when the carriage member (s) carrying the first and second seek coils 241 and 242 are moved when the magnetic fields by seek coils exist, currents whose direction is opposite to that of the current fed to the coils are caused in the surfaces of the short rings 255 by the electromagnetic induction caused by the movement of the carriage member (s). As shown in FIG. 37, the currents caused by the electromagnetic induction cause the short rings 255 to develop magnetic fields whose direction is opposite to that of the magnetic fields as developed by the current as fed. The magnetic fields by the short rings 255 cancel the magnetic fields by the center magnetic yokes 251 yokes. For this reason, as shown in FIG. 38, a magnetic field developed by the permanent magnet 206, which act on the first and second seek coils 241 and 242, can be maintained constantly regardless the fact that wherether feeding current in applied to the seek coils 241 and 242.

Let us adjust the first and second gain adjust circuits 291 and 292, which re respectively inserted between the first seek coil 241 and the first drive circuit 281 and between the second seek coil 242 and the second drive circuit 282, so that a ration of the first drive force ($_{R1}$) to the second drive force ($f_{R2}$), the following condition:

$$f_{R1}/f_{R2} = m/M$$

where m indicates the mass of the movable focus adjusting member, and M, the mass of the carriage member. The above relationship holds on the central portion of the center magnetic yoke 251 and also in the portions close to the side magnetic yokes 253 and 254. Therefore, there never occurs a resonance phenomenon among the movable focus adjusting member (p), the carriage member (s), and the plate spring (t). The mechanical vibration characteristics required for tracking and seek controls can readily be obtained.

Further, the first drive circuit 281 for feeding current to the first seek coil 241 and second drive circuit 282 for feeding current to the second seek coil 242 are provided. No closed circuit is formed between the first and second seek coils 241 and 242. No phase shift occurs in the current fed to each of the seek coils 241 and 242. This feature additionally contributes to prevent the resonance phenomenon of the movable focus adjusting member (p) and the carriage member (s).

Accordingly, the movable focus adjusting member (p) and the carriage member (s) can be simultaneously moved irrespective of a frequency of the current fed to each of the seek coils 241 and 242. Reliable seek and tracking controls are ensured.

Figure 40:
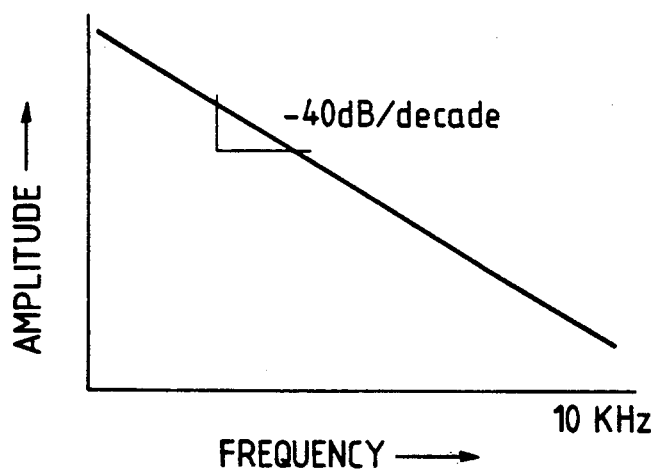
FIG. 40 is a graph showing a relationship between amplitude and frequency of a vibration of the movable focus adjusting member in the seek direction.
Figure 41:
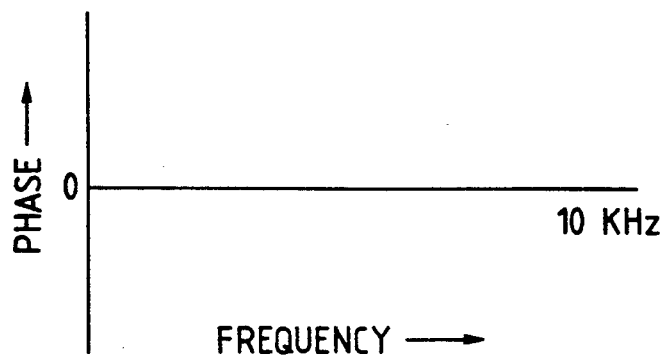
FIG. 41 is a graph showing a relationship between phase and frequency of a vibration of the movable focus adjusting member in the seek direction.

FIG. 40 is a graph showing a relationship between amplitude and frequency of an vibration of the movable focus adjusting member (p) when the movable focus adjusting member (p) and the carriage member (s) are vibrating. FIG. 41 is a graph showing a relationship between phase and frequency of an vibration of the movable focus adjusting member (p) when the movable focus adjusting member (p) and the carriage member (s) are vibrating. As seen from those graphs, no resonance phenomenon occurs.

Seventh embodiment

Figure 42:
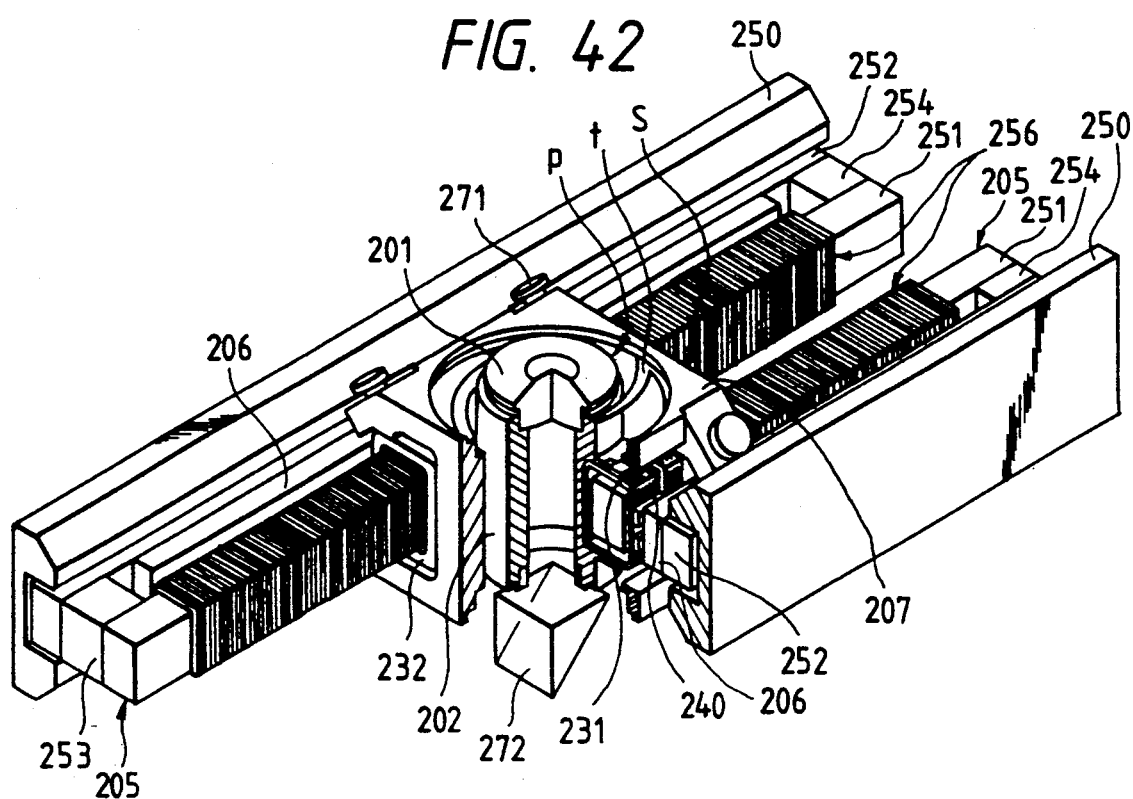
FIG. 42 is a partially broken perspective view of an optical recording/reproducing apparatus according to a seventh embodiment of the present invention.
Figure 43:
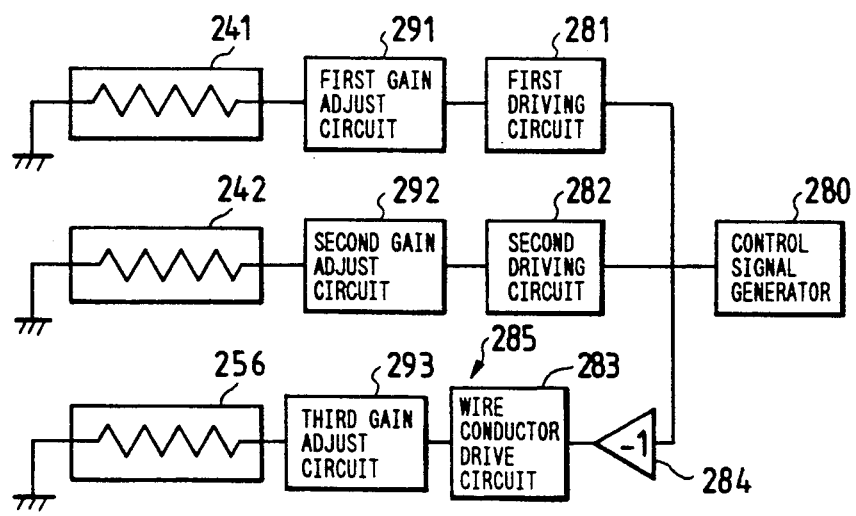
FIG. 43 is a circuit diagram for feeding current to the first and second seek coils, and the wire conductor.

An optical recording/reproducing apparatus according to a seventh embodiment of the present invention is different from the apparatus according to the sixth embodiment in the following points. As shown in FIGS. 42 to 42, a wire conductor, in place of the short ring 255 as the magnetic field reducing means, is wound around each center magnetic yoke 251. A magnetic field adjust drive circuit 285 for feeding current to the wire conductor 256 if provided. The remaining arrangement of the instant embodiment is substantially the same as that of the sixth embodiment.

The wire conductor 256 is made of a wire metal, such as copper. The center magnetic yoke 251 is covered with an insulating layer (not shown). The conductor 256 is uniformly wound on the insulating layer. The magnetic filed adjust drive circuit 285 is connected in parallel with the control signal generator 280, and the first and second drive circuits 281 and 282 are connected to the control signal generator 280 in parallel. The circuit 285 consists of a signal inverting circuit 284 for inverting an output signal of the control signal generator 280, a wire conductor drive circuit 283 for feeding the wire conductor 256 on a current whose direction is opposite to that of the currents fed to the first and second seek coils 241 and 242, and a third gain adjust circuit 293 for adjusting an amplitude of the current fed from the wire conductor drive circuit 283.

The optical recording/reproducing apparatus according to the seventh embodiment is uniquely provided with the wire conductor 256 wound around each center magnetic yoke 251, and the conductor drive circuit 283 for feeding the wire conductor 256 on a current whose direction is opposite to that of the currents fed to the first and second seek coils 241 and 242. The sixth embodiment, like the fifth embodiment, can effectively prevent the uniform magnetic field by the permanent magnet 206 from being disturbed or deformed when the apparatus is in the seek control mode or the tracking mode.

Figure 44:
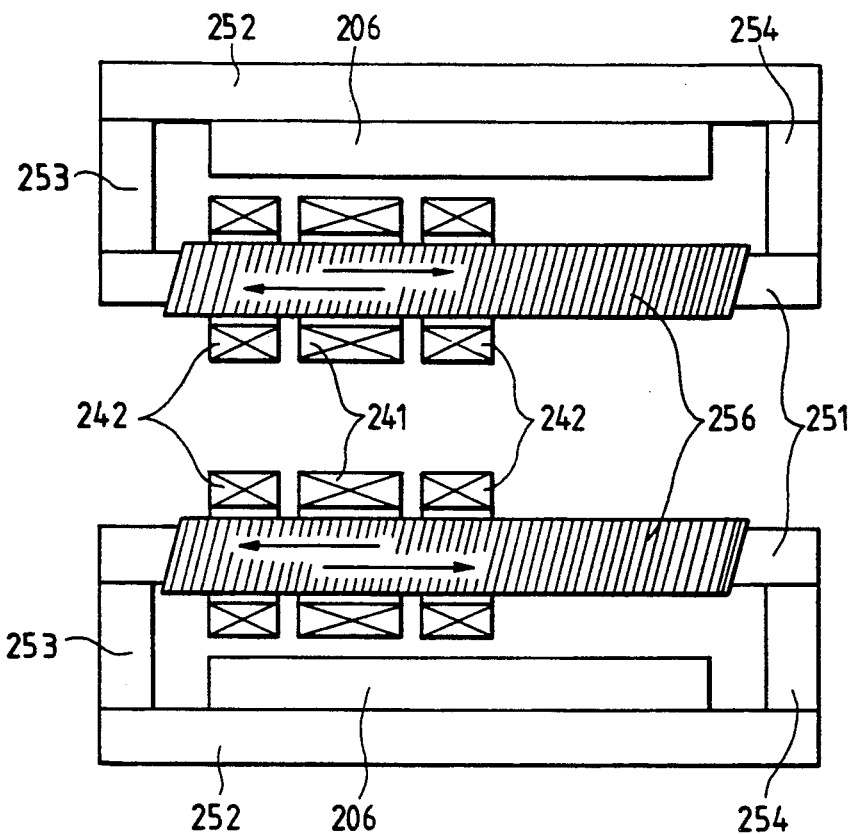
FIG. 44 is a plan view showing a relationship among the first and second seek coils, an endless magnetic yoke, and a wire conductor in seventh embodiment.

In the seek control mode or the tracking control mode, the current is fed to the first and second seek coils 241 and 241 with the center magnetic yoke 251 being magnetized. Therefore, the magnetic field is developed from the center magnetic yoke 251. At the same time, as shown in FIG. 44, current whose direction is opposite to that of the current to the seek coils is fed to the wire conductor 256, from the magnetic field adjust drive circuit 285. Accordingly, the wire conductor 256 develops a magnetic field in which a direction of the magnetic field is opposite to the direction of the magnetic field developed by the center magnetic yoke 251. The magnetic field of each seek coil is canceled by the magnetic field of the wire conductor 256 so that, a distribution of the magnetic field developed by the permanent magnet 206 is reduced, and the magnetic field developed by the permanent magnet 206 to the first and second seek coils is constantly maintained regardless the fact that the whether the current flows to the first and second seek coils or not.

The apparatus is setup so that a ratio of first and second drive force $f_{R1}/f_{R2} = m/M$ where m is the mass of focus movable portion, and M ius the mass of the carriage member.

The optical recording/reproducing apparatus according to the sixth embodiment, the magnetic fields applied by the yokes by could be minimized by adjusting the current applied to the wire conductor 256. The magnetic field, which is developed by the permanent magnet 206 and acts on both the first and second seek coils 241 and 242, can be applied more uniform in distribution.

Accordingly the above relationship holds in the central region of the center magnetic yoke 251 and also in portions close to the side magnetic yokes 253 and 254. Therefore, there never occurs a resonance phenomenon among the movable focus adjusting member (p), the carriage member (s), and the plate spring (t). The mechanical vibration characteristics required for tracking and seek controls can readily be obtained.

Eighth embodiment

Figure 45:
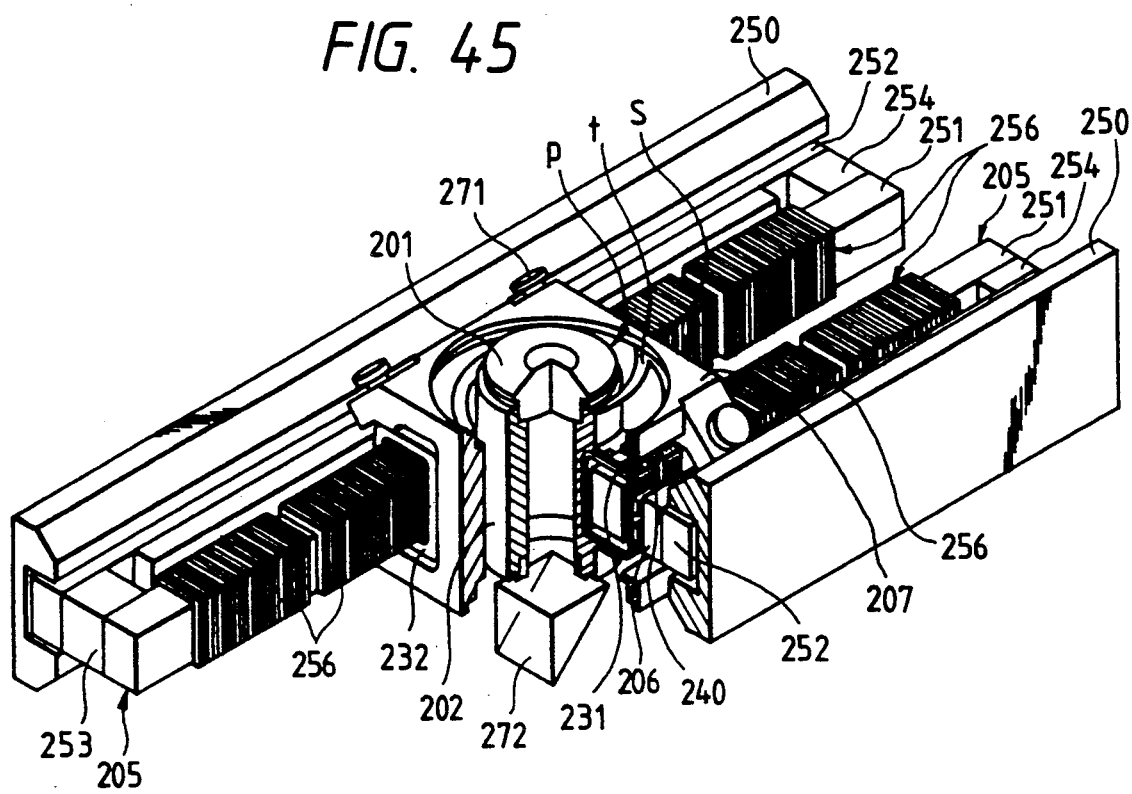
FIG. 45 is a partially broken perspective view of an optical recording/responding apparatus according to an eighth embodiment of the present invention.
Figure 46:
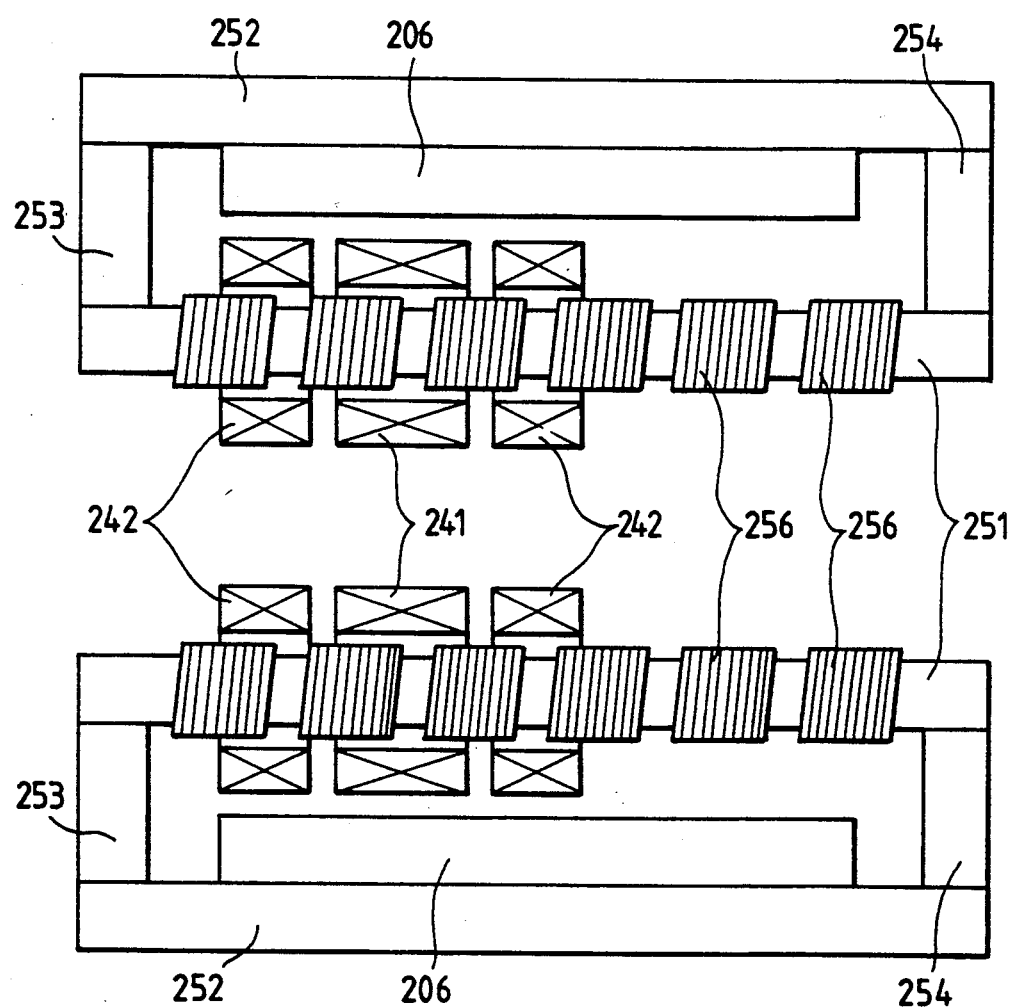
FIG. 46 is a plan view showing a relationship among the first and second seek coils, an endless magnetic yoke, and wire conductors in eighth embodiment.
Figure 47:
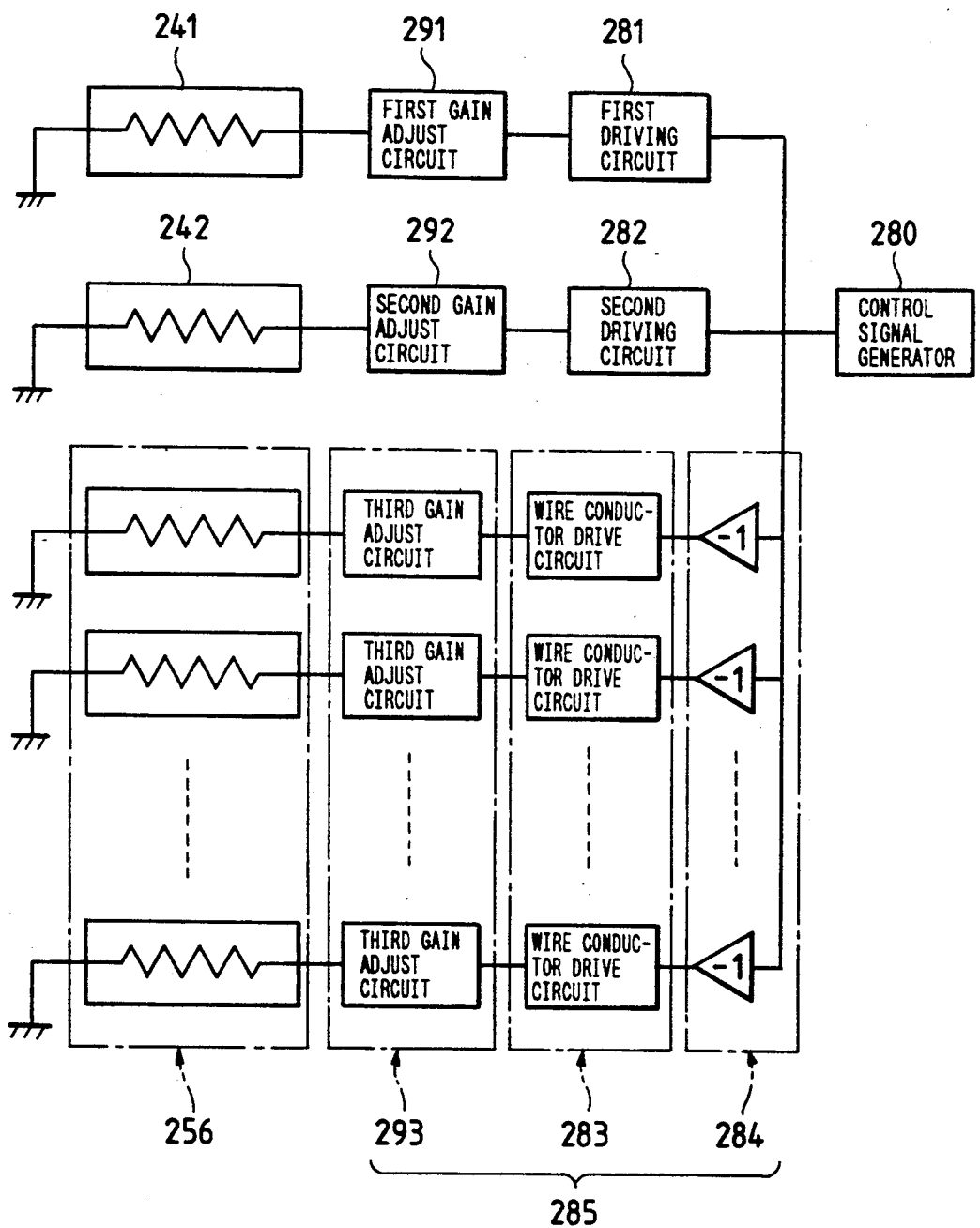
FIG. 47 is a circuit diagram for feeding current to the first and second seek coils, and wire conductors.

A eighth embodiment of a optical recording/reproducing apparatus according to the present invention will now be described with reference to FIGS. 45 through 47.

The optical recording/reproducing apparatus according to the eighth embodiment of the present invention is different from the apparatus according to the fifth embodiment in the following points. As shown in FIGS. 45 through 47, a plurality of wire conductors 256, in place of the short ring 255 as the magnetic field reducing means, are wound around each center magnetic yoke 251. A plurality of magnetic field adjust drive circuits 285 for feeding current to the wire conductors 256 are provided. The remaining arrangement of the seventh embodiment is substantially the same as that of the fifth embodiment.

Each wire conductor 256 is of a wire metal, such as copper. The center magnetic yoke 251 is covered with an insulating layer (not shown). The conductors 256 are disposed along the wire conductor and separately at predetermined intervals, and uniformly wound around the insulating layer at the predetermined locations. The magnetic field adjust drive circuits 285 are connected in parallel to each other, and for reception with the control signal generator 280, and are connected also in parallel with the first and second drive circuits 281 and 282. Each circuit 285 consists of signal inverting circuit 284 for inverting an output signal of the control signal generator 280, a wire conductor drive circuit 283 for feeding to the wire conductor 256 a current whose direction is opposite to that of the currents fed to the first and second seek coils 241 and 242, and a third gain adjust circuit 293 for adjusting an amplitude of the current fed from the wire conductor drive circuit 283.

The optical recording/reproducing apparatus according to the eighth embodiment is uniquely provided with the wire conductors 256 which are disposed along the wire conductor and separately at predetermined intervals and wound around each center magnetic yoke 251, and the conductor drive circuit 283 for feeding the wire conductor 256 to a current whose direction is opposite to that of the current fed to the first and second seek coils 241 and 242. The seventh embodiment, like the fifth and sixth embodiments, can effectively prevent the uniform magnetic field by the permanent magnet 206 from being disturbed or deformed when the apparatus is in the seek control mode or the tracking mode. Accordingly, the mechanical vibration characteristics required for tracking and seek controls can readily be obtained.

In the eighth embodiment, a plurality of wire conductors 256 are provided. A plurality of magnetic field drive circuits 285 for feeding current to the wire conductors are provided in association with the wire conductors. Current may be selectively fed to only the wire conductors as required. In this respect, electric power is saved.

As described above, those embodiments influence by the magnetic fields developed by the yokes is reduced to be negligible. Accordingly, a magnetic field developed by each magnet, which acts on the first and second seek coils, can be kept uniform irrespective of feeding current to those seek coils.

Under such a condition, the electromagnetic forces acting on the first and second seek coils can be controlled to be desired values. This ensures exact controls of seek and tracking operations.

According to those embodiments, each of the magnetic field reducing means is conductive means, the conductive means being disposed extending in the longitudinal direction of each center magnetic yoke and covering the center magnetic yoke.

With such an arrangement, the seek and tracking operation can exactly be controlled with a relatively simple construction.

According to those embodiments, each of the magnetic field reducing means includes:

a wire conductor uniformly wound around an electrical insulating means covering the center magnetic yoke; and a magnetic field adjust drive circuit for feeding to the wire conductor a current whose direction is opposite to that of the current fed to the first and second seek coils.

The above arrangement further reduces the influence by the yoke developed magnetic field, and contributes to making the seek and tracking controls more exact.

According to those embodiments, each of the magnetic field reducing means includes:

a plurality of wire conductors separately disposed along each center magnetic yoke, and each wire conductor being uniformly wound around an electrical insulating means covering the center magnetic yoke; and a plurality of magnetic field adjust drive circuits respectively provided in association with the wire conductors, each magnetic field adjust drive circuit for feeding to the wire conductor a current whose direction is opposite to that of the current fed to the first and second seek coils.

With the above arrangement, an intensity of the magnetic field whose direction is opposite to that of the current fed to each yoke can be controlled to be a desired value by adjusting the current fed to each wire conductor. Therefore, the arrangement according to those fifth to seventh embodiment further reduces the influence by the yoke developed magnetic field, and contributes to making the seek and tracking controls more exact.

Further, of the plurality of magnetic field adjust drive circuits, only desired drive circuits may be selectively driven. This feature saves the electric power consumed by the apparatus.

According to those embodiments of the present invention, the conductive covering means and the wire conductor provided on the outer surface of each center magnetic yoke may be any of copper, silver platinum, copper alloy, iron alloy, aluminum alloy, and the like.

The covering means may directly be formed on the outer surface of each center yoke by a film forming method, such as a vapor depositing method. Any of the metals as mentioned above is formed to be tubular. The center magnetic yoke is inserted into the tubular metal member. Any suitable method may be used for forming the converging means.

What is claimed is:

1. An optical recording/reproducing apparatus comprising:

a focus adjusting member including
    means for converging light onto a focal plane of an optical recording medium,
    focus coil means, responsive to a first current, for driving the converging means in a direction substantially vertical to the focal plane by electromagnetic force,
    seek coil means, activated by a second current, for driving the converging means in a radial direction of the optical recording medium by electromagnetic force;

carriage means including means for driving in the radial direction;

spring means, having a first portion coupled to the focus adjusting member and a second portion coupled to the carriage means, for supporting the focus adjusting member; and magnetic force generating means, between the focus adjusting member and the carriage means, for generating magnetic force that holds the focus adjusting member substantially stationary relative to the carriage means in the radial direction.

2. The optical recording/reproducing apparatus as claimed in claim 1, wherein said magnetic force generating means includes a focus adjustment magnet disposed in a tube portion of a bobbin on which said seek coil means is wound, end portions of said adjust magnet being coupled to said carriage means.

3. The optical recording/reproducing apparatus as claimed in claim 1, further including means for supplying the second current such that:

$$f = fs \cdot M/(m+M),$$

wherein fs represents a drive force in the radial direction on the focus adjusting member, f represents a drive force in the radial direction in said carriage means, m represents a mass of said focus adjusting member, and M represents a mass of said carriage means.

4. The optical recording/reproducing apparatus as claimed in claim 1, further comprising:

resonance absorbing means in a gap between said focus adjusting member and said carriage means for absorbing a resonance of said focus adjusting member and said carriage means; and holding means disposed on at least one of said focus adjusting member and said carriage means for holding said resonance means.

5. An optical recording/reproducing apparatus comprising:

rail means;

a focus adjusting member including
    support means;
    means for converging light onto a focal plane of an optical recording medium,
    focus coil means, on the support means and responsive to a current, for driving the converging means in a direction substantially vertical to be focal plane by electromagnetic force,
    seek coil means, on the support means and responsive to a first current, for driving the converging means in a radial direction of the optical recording medium by electromagnetic interaction with the rail means;

carriage means including second seek coil means, responsive to a second current, for driving in the radial direction by electromagnetic interaction with the rail means;

spring means, having a first portion coupled to the focus adjusting member and a second portion coupled to the carriage means, for supporting the focus adjusting member;

first driving circuit means for feeding the first current to the first seek coil means;

second driving circuit means for feeding the second current to the second seek coil means, wherein the first and second driving circuit means supply the first and second currents such that:

ti $f1/f2 = m/M,$ wherein f1 represents a drive force in the radial direction on the focus adjusting member, f2 represents a drive force in the radial direction on the carriage means, m represents a mass of the focus adjusting member, and M represents a mass of the carriage means.

6. The optical recording apparatus as claimed in claim 5, further comprising:
   resonance absorbing means in a gap between said focus adjusting member and said carriage means for absorbing a resonance of said focus adjusting member and said carriage means; and
   holding means disposed on at least one of said focus adjusting member and said carriage means for holding said resonance absorbing means.

7. An optical recording/reproducing apparatus comprising:
   rail means including
      magnetic means for generating lines of magnetic force,
      distribution reducing means for reducing a distribution of a magnetic field developed from the magnetic means, and
      magnetic field reducing means for reducing a magnetic field induced by a current applied to the first and second seek coil means;
   a focus adjusting member including
      first support means;
      means for converging light onto a focal plane of an optical recording medium,
      focus coil means, on the first support means and responsive to a first current, for driving the converging means in a direction substantially vertical to the focal plane by electromagnetic force,
      seek coil means, on the first support means and responsive to a second current, for driving the converging means in a radial direction of the optical recording medium by electromagnetic interaction with the rail means;
   carriage means including
      second support means, and
      means, on the second support means, for driving in the radial direction by electromagnetic interaction
      with the rail means; and
   spring means, having a first portion coupled to the focus adjusting member and a second portion coupled to the carriage means, for supporting the focus adjusting member.

8. The optical recording/reproducing apparatus as claimed in claim 7, further comprising:
   resonance absorbing means in a gap between said focus adjusting member and said carriage means for absorbing a resonance of said focus adjusting member and said carriage means; and
   holding means disposed on at least one of said focus adjusting member and said carriage means for holding said resonance absorbing means.

9. The optical recording/reproducing apparatus as claimed in claim 7, further including means for supplying the second current such that:

$$f1/f2 = m/M,$$

wherein f1 represents a drive force in the radial direction on the focus adjusting member, f2 represents a drive force in the radial direction on said carriage means, m represents a mass of said focus adjusting member, and M represents a mass of said carriage means 10. An optical recording/reproducing apparatus comprising:
   a focus adjusting member including
      means for converging light onto a focal plane of an optical recording medium,
      focus coil means, responsive to a current, for driving the converging means in a direction substantially vertical to the focal plane by electromagnetic force, and
      first seek coil means, responsive to a first current, for driving the converging means in a radial direction of the optical recording medium by electromagnetic force;
   a carriage member including
      main carriage means,
      second seek coil means, responsive to a second current, for driving the main carriage means in the radial direction by electromagnetic force; and
   spring means fixed at one portion thereof to the focus adjusting member and the other portion thereof to the carriage mans for supporting the focus adjusting member;
   magnetic means for generating line of magnetic force;
   means for reducing a distribution of a magnetic field developed from the magnetic means, including a magnetic yoke; and
   electric magnetic field reducing means for reducing a magnetic field induced by the first and second currents.

11. The optical recording/reproducing apparatus as claimed in claim 10, wherein said electric magnetic field reducing means reducing means includes a center magnetic yoke in said first and second supporting means and disposed along said radial direction of said optical recording medium, back magnetic yoke disposed along said center magnetic yoke, a first side magnetic yoke coupling an end of the center magnetic yoke to an end of the back magnetic yoke, and a second side magnetic yoke coupling another end of said center magnetic yoke to another end of said back magnetic yoke.

12. The optical recording/reproducing apparatus as claimed in claim 11, wherein said electric magnetic field reducing means includes an electric conductive material covered on outer portion of said center magnetic yoke in a longitudinal direction of said center magnetic yoke.

13. The optical recording/reproducing apparatus as claimed in claim 11, wherein said electric magnetic field reducing means include an electrical insulating member covered on an outer surface of said center magnetic yoke, and an electric conductive member uniformly wound on said electrical insulating member.

14. The optical recording/reproducing apparatus as claimed in claim 13, further comprising: adjustable magnetic field driving circuit means for applying a current whose direction is opposite to a direction of said first and second seek coil means to said electric magnetic field reducing means.

15. The optical recording/reproducing apparatus as claimed in claim 11, wherein said electric magnetic field reducing means includes an electrical insulating member covered on an outer surface of said center magnetic yoke, and a plurality of wire conductors independently wound at a predetermined interval around said insulating member in said longitudinal direction of said center magnetic yoke.

16. The optical recording/reproducing apparatus as claimed in claim 15, further comprising: adjustable magnetic field driving circuits for applying a current whose direction is opposite to a direction of said first and second seek coil means to said conductors correspondingly.

* * * * *

UNITED STATES PATENT AND TRADEMARK OFFICE
CERTIFICATE OF CORRECTION

PATENT NO. : 5,218,587
DATED : June 08, 1993
INVENTOR(S) : Takashi Nomiyama et al.

It is certified that error appears in the above-indentified patent and that said Letters Patent is hereby corrected as shown below:

Abstract, line 3, change "beams" to --beam--.

Claim 2, column 26, line 12, change "adjustment" to --adjust--.

Claim 5, column 26, line 46, change "be" to --the--.

Claim 5, column 26, last line delete "ti".

Claim 9, column 27, line 66, after "means" insert --.--.

UNITED STATES PATENT AND TRADEMARK OFFICE
CERTIFICATE OF CORRECTION

PATENT NO. : 5,218,587
DATED : June 8, 1993
INVENTOR(S) : Takashi Nomiyama et al It is certified that error appears in the above-indentified patent and that said Letters Patent is hereby corrected as shown below:

Claim 10, column 28, line 19, change "mans" to --means--.

Claim 13, column 28, line 45, change "include" to --includes --.

Signed and Sealed this

Twelfth Day of April, 1994

Attest:

BRUCE LEHMAN

Attesting Officer

Commissioner of Patents and Trademarks